US008824583B2

(12) United States Patent
Howard et al.

(10) Patent No.: US 8,824,583 B2
(45) Date of Patent: Sep. 2, 2014

(54) REDUCED COMPLEXITY BEAM-STEERED MIMO OFDM SYSTEM

(71) Applicant: QUALCOMM Incorporated, San Diego, CA (US)

(72) Inventors: Steven J. Howard, Ashland, MA (US); John W. Ketchum, Harvard, MA (US); Mark S. Wallace, Bedford, MA (US); Jay Rodney Walton, Carlisle, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/793,520

(22) Filed: Mar. 11, 2013

(65) Prior Publication Data
US 2013/0188677 A1 Jul. 25, 2013

Related U.S. Application Data

(62) Division of application No. 11/481,705, filed on Jul. 5, 2006, now Pat. No. 8,543,070.

(60) Provisional application No. 60/794,615, filed on Apr. 24, 2006.

(51) Int. Cl.
| | |
|---|---|
| *H04L 27/28* | (2006.01) |
| *H04B 7/06* | (2006.01) |
| *H04L 25/02* | (2006.01) |
| *H04B 7/04* | (2006.01) |
| *H04L 25/03* | (2006.01) |
| *H04L 5/00* | (2006.01) |

(52) U.S. Cl.
CPC .... *H04B 7/0421* (2013.01); *H04L 2025/03426* (2013.01); *H04L 25/03343* (2013.01); *H04B 7/0634* (2013.01); *H04L 25/0248* (2013.01); *H04L 2025/03802* (2013.01); *H04B 7/066* (2013.01); *H04B 7/0639* (2013.01); *H04L 5/0048* (2013.01); *H04L 5/0023* (2013.01); *H04L 2025/03414* (2013.01)
USPC .......................................... 375/260

(58) Field of Classification Search
USPC ............ 375/260, 295, 296; 455/69, 702, 703
See application file for complete search history.

(56) References Cited

U.S. PATENT DOCUMENTS

| | | | |
|---|---|---|---|
| 5,581,583 | A | 12/1996 | Conti et al. |
| 5,668,837 | A | 9/1997 | Dent |

(Continued)

FOREIGN PATENT DOCUMENTS

| | | | |
|---|---|---|---|
| CA | 2490520 | A1 | 12/2003 |
| CA | 2510840 | A1 | 7/2004 |

(Continued)

OTHER PUBLICATIONS

Damen et al., "Systematic Construction of Full Diversity Algebraic Constellations", IEEE Transactions on Information Theroty, vol. 49, No. 12, Dec. 2003.

(Continued)

*Primary Examiner* — Kevin Kim
(74) *Attorney, Agent, or Firm* — QUALCOMM IP Department; James Hunt Yancey, Jr.

(57) ABSTRACT

Techniques for transmitting data using channel information for a subset of all subcarriers used for data transmission are described. A transmitter station receives channel information for at least one subcarrier that is a subset of multiple subcarriers used for data transmission. The channel information may include at least one transmit steering matrix, at least one set of eigenvectors, at least one channel response matrix, at least one channel covariance matrix, an unsteered pilot, or a steered pilot for the at least one subcarrier. The transmitter station obtains at least one transmit steering matrix for the at least one subcarrier from the channel information and determines a transmit steering matrix for each of the multiple subcarriers. The transmitter station performs transmit steering or beam-steering for each of the multiple subcarriers with the transmit steering matrix for that subcarrier.

23 Claims, 6 Drawing Sheets

(56) References Cited

U.S. PATENT DOCUMENTS

| | | | |
|---|---|---|---|
| 5,757,845 A | 5/1998 | Fukawa et al. |
| 6,061,023 A | 5/2000 | Daniel et al. |
| 6,118,758 A | 9/2000 | Marchok et al. |
| 6,144,711 A | 11/2000 | Raleigh et al. |
| 6,175,743 B1 | 1/2001 | Alperovich et al. |
| 6,198,775 B1 | 3/2001 | Khayrallah et al. |
| 6,218,985 B1 | 4/2001 | Adams |
| 6,298,035 B1 | 10/2001 | Heiskala |
| 6,314,147 B1 | 11/2001 | Liang et al. |
| 6,351,499 B1 | 2/2002 | Paulraj et al. |
| 6,441,786 B1 | 8/2002 | Jasper et al. |
| 6,452,981 B1 | 9/2002 | Raleigh et al. |
| 6,473,467 B1 | 10/2002 | Wallace et al. |
| 6,477,161 B1 | 11/2002 | Hudson et al. |
| 6,486,828 B1 | 11/2002 | Cahn et al. |
| 6,493,331 B1 | 12/2002 | Walton et al. |
| 6,496,535 B2 | 12/2002 | Xu |
| 6,542,556 B1 | 4/2003 | Kuchi et al. |
| 6,545,997 B1 | 4/2003 | Boehnke et al. |
| 6,618,454 B1 | 9/2003 | Agrawal et al. |
| 6,636,568 B2 | 10/2003 | Kadous |
| 6,642,888 B2 | 11/2003 | Kishigami et al. |
| 6,678,263 B1 | 1/2004 | Hammons, Jr. et al. |
| 6,694,147 B1 | 2/2004 | Viswanath et al. |
| 6,711,124 B2 | 3/2004 | Khayrallah et al. |
| 6,711,528 B2 | 3/2004 | Dishman et al. |
| 6,760,388 B2 | 7/2004 | Ketchum et al. |
| 6,763,073 B2 | 7/2004 | Foschini et al. |
| 6,771,706 B2 | 8/2004 | Ling et al. |
| 6,785,341 B2 | 8/2004 | Walton et al. |
| 6,788,661 B1 | 9/2004 | Ylitalo et al. |
| 6,801,790 B2 | 10/2004 | Rudrapatna |
| 6,804,307 B1 | 10/2004 | Popovic |
| 6,810,506 B1 | 10/2004 | Levy |
| 6,816,555 B2 | 11/2004 | Sakoda |
| 6,842,487 B1 | 1/2005 | Larsson |
| 6,847,306 B2 | 1/2005 | Diba et al. |
| 6,859,747 B2 | 2/2005 | Yutkowitz |
| 6,862,271 B2 | 3/2005 | Medvedev et al. |
| 6,873,606 B2 | 3/2005 | Agrawal et al. |
| 6,888,789 B1 | 5/2005 | Sakoda et al. |
| 6,937,189 B2 | 8/2005 | Kim |
| 6,940,917 B2 | 9/2005 | Menon et al. |
| 6,952,454 B1 | 10/2005 | Jalali et al. |
| 6,956,897 B1 | 10/2005 | Honig |
| 6,975,668 B2 | 12/2005 | Zhang |
| 6,982,946 B2 | 1/2006 | Wiberg et al. |
| 6,999,472 B2 | 2/2006 | Hamalainen et al. |
| 7,002,900 B2 | 2/2006 | Walton et al. |
| 7,020,110 B2 | 3/2006 | Walton et al. |
| 7,020,490 B2 | 3/2006 | Khatri |
| 7,024,166 B2 | 4/2006 | Wallace et al. |
| 7,031,669 B2 | 4/2006 | Vaidyanathan et al. |
| 7,057,555 B2 | 6/2006 | Lewis |
| 7,061,969 B2 | 6/2006 | Alamouti et al. |
| 7,065,144 B2 | 6/2006 | Walton et al. |
| 7,065,156 B1 | 6/2006 | Kuchi |
| 7,076,263 B2 | 7/2006 | Medvedev et al. |
| 7,079,870 B2 | 7/2006 | Vaidyanathan |
| 7,092,737 B2 | 8/2006 | Horng et al. |
| 7,095,709 B2 | 8/2006 | Walton et al. |
| 7,095,987 B2 | 8/2006 | Brothers, Jr. et al. |
| 7,099,678 B2 | 8/2006 | Vaidyanathan |
| 7,099,698 B2 | 8/2006 | Tarokh et al. |
| 7,110,350 B2 | 9/2006 | Li et al. |
| 7,110,378 B2 | 9/2006 | Onggosanusi et al. |
| 7,110,463 B2 | 9/2006 | Wallace et al. |
| 7,116,723 B2 | 10/2006 | Kim et al. |
| 7,130,580 B2 | 10/2006 | Alexiou et al. |
| 7,149,254 B2 | 12/2006 | Sampath |
| 7,151,806 B2 | 12/2006 | Hosoda et al. |
| 7,151,809 B2 | 12/2006 | Ketchum et al. |
| 7,158,498 B2 | 1/2007 | Lundby et al. |
| 7,158,579 B2 | 1/2007 | Hottinen |
| 7,190,734 B2 | 3/2007 | Giannakis et al. |
| 7,194,042 B2 | 3/2007 | Walton et al. |
| 7,197,084 B2 | 3/2007 | Ketchum et al. |
| 7,200,631 B2 | 4/2007 | Mailaender et al. |
| 7,206,354 B2 | 4/2007 | Wallace et al. |
| 7,218,689 B2 | 5/2007 | Gupta |
| 7,227,906 B2 | 6/2007 | Fukuda et al. |
| 7,236,478 B2 | 6/2007 | Wu et al. |
| 7,280,625 B2 | 10/2007 | Ketchum et al. |
| 7,292,623 B2 | 11/2007 | Reznik |
| 7,298,805 B2 | 11/2007 | Walton et al. |
| 7,301,924 B1 | 11/2007 | Gurbuz et al. |
| 7,302,009 B2 | 11/2007 | Walton et al. |
| 7,317,750 B2 | 1/2008 | Shattil |
| 7,324,429 B2 | 1/2008 | Walton et al. |
| 7,324,482 B2 | 1/2008 | Hammons, Jr. et al. |
| 7,327,795 B2 | 2/2008 | Oprea |
| 7,327,798 B2 | 2/2008 | Won |
| 7,327,800 B2 | 2/2008 | Oprea et al. |
| 7,336,727 B2 * | 2/2008 | Mukkavilli et al. .......... 375/299 |
| 7,336,746 B2 | 2/2008 | Walton et al. |
| 7,356,073 B2 | 4/2008 | Heikkila |
| 7,359,466 B2 | 4/2008 | Huang et al. |
| 7,385,617 B2 | 6/2008 | Tahat |
| 7,394,754 B2 | 7/2008 | Li et al. |
| 7,436,896 B2 | 10/2008 | Hottinen et al. |
| 7,447,268 B2 | 11/2008 | Sadowsky et al. |
| 7,522,673 B2 | 4/2009 | Giannakis et al. |
| 7,529,177 B2 | 5/2009 | Celebi et al. |
| 7,532,563 B1 | 5/2009 | Shirali et al. |
| 7,539,253 B2 | 5/2009 | Li et al. |
| 7,555,053 B2 | 6/2009 | Trachewsky et al. |
| 7,583,747 B1 | 9/2009 | Damen et al. |
| 7,593,317 B2 | 9/2009 | Yuda et al. |
| 7,653,142 B2 | 1/2010 | Ketchum et al. |
| 7,711,762 B2 | 5/2010 | Howard et al. |
| 7,742,546 B2 | 6/2010 | Ketchum et al. |
| 7,764,754 B2 | 7/2010 | Walton et al. |
| 7,787,554 B1 | 8/2010 | Nabar et al. |
| 7,894,548 B2 | 2/2011 | Walton et al. |
| 7,895,254 B2 | 2/2011 | Ketchum et al. |
| 7,899,131 B2 | 3/2011 | Walton et al. |
| 7,907,689 B2 | 3/2011 | Walton et al. |
| 7,974,359 B2 | 7/2011 | Gorokhov et al. |
| 7,978,649 B2 | 7/2011 | Howard et al. |
| 7,978,778 B2 | 7/2011 | Wallace et al. |
| 7,991,065 B2 | 8/2011 | Wallace et al. |
| 8,169,889 B2 | 5/2012 | Walton et al. |
| 8,204,149 B2 | 6/2012 | Walton et al. |
| 8,208,364 B2 | 6/2012 | Walton et al. |
| 8,285,226 B2 | 10/2012 | Lundby et al. |
| 8,290,089 B2 | 10/2012 | Howard et al. |
| 8,325,844 B2 | 12/2012 | Walton et al. |
| 2001/0050964 A1 | 12/2001 | Foschini et al. |
| 2001/0053124 A1 | 12/2001 | Ichihara et al. |
| 2002/0009125 A1 | 1/2002 | Shi |
| 2002/0034217 A1 | 3/2002 | Zhang |
| 2002/0091943 A1 | 7/2002 | Lau |
| 2002/0102940 A1 | 8/2002 | Bohnke et al. |
| 2002/0114269 A1 | 8/2002 | Onggosanusi et al. |
| 2002/0127978 A1 | 9/2002 | Khatri |
| 2002/0172264 A1 | 11/2002 | Wiberg et al. |
| 2002/0172269 A1 | 11/2002 | Xu |
| 2002/0193146 A1 | 12/2002 | Wallace et al. |
| 2002/0196742 A1 | 12/2002 | Baker et al. |
| 2003/0011274 A1 | 1/2003 | Saint-Michel et al. |
| 2003/0016637 A1 | 1/2003 | Khayrallah et al. |
| 2003/0026349 A1 | 2/2003 | Onggosanusi et al. |
| 2003/0033105 A1 | 2/2003 | Yutkowitz |
| 2003/0043929 A1 | 3/2003 | Sampath |
| 2003/0072254 A1 | 4/2003 | Ma et al. |
| 2003/0072382 A1 | 4/2003 | Raleigh et al. |
| 2003/0073464 A1 | 4/2003 | Giannakis et al. |
| 2003/0076908 A1 | 4/2003 | Huang et al. |
| 2003/0108117 A1 | 6/2003 | Ketchum et al. |
| 2003/0112745 A1 | 6/2003 | Zhuang et al. |
| 2003/0123565 A1 | 7/2003 | Fukuda et al. |
| 2003/0123567 A1 | 7/2003 | Shigemasa et al. |
| 2003/0125040 A1 | 7/2003 | Walton et al. |
| 2003/0128658 A1 | 7/2003 | Walton et al. |

(56) References Cited

U.S. PATENT DOCUMENTS

| | | |
|---|---|---|
| 2003/0161282 A1 | 8/2003 | Medvedev et al. |
| 2003/0161412 A1 | 8/2003 | Niida et al. |
| 2003/0181211 A1 | 9/2003 | Razavilar et al. |
| 2003/0186698 A1 | 10/2003 | Holma et al. |
| 2003/0189999 A1 | 10/2003 | Kadous |
| 2003/0201936 A1 | 10/2003 | Kim |
| 2003/0204380 A1 | 10/2003 | Dishman et al. |
| 2003/0218973 A1 | 11/2003 | Oprea et al. |
| 2003/0228850 A1 | 12/2003 | Hwang |
| 2003/0235147 A1 | 12/2003 | Walton et al. |
| 2003/0235238 A1 | 12/2003 | Schelm et al. |
| 2003/0235255 A1 | 12/2003 | Ketchum et al. |
| 2004/0002364 A1 | 1/2004 | Trikkonen et al. |
| 2004/0008126 A1 | 1/2004 | Diba et al. |
| 2004/0022183 A1 | 2/2004 | Li et al. |
| 2004/0042439 A1 | 3/2004 | Menon et al. |
| 2004/0048584 A1 | 3/2004 | Vaidyanathan et al. |
| 2004/0052315 A1 | 3/2004 | Thielecke et al. |
| 2004/0066773 A1 | 4/2004 | Sun et al. |
| 2004/0081263 A1 | 4/2004 | Lee et al. |
| 2004/0082356 A1 | 4/2004 | Walton et al. |
| 2004/0085939 A1 | 5/2004 | Wallace et al. |
| 2004/0086027 A1 | 5/2004 | Shattil |
| 2004/0087324 A1 | 5/2004 | Ketchum et al. |
| 2004/0102157 A1 | 5/2004 | Lewis |
| 2004/0136349 A1 | 7/2004 | Walton et al. |
| 2004/0139137 A1 | 7/2004 | Mailaender et al. |
| 2004/0146014 A1 | 7/2004 | Hammons, Jr. et al. |
| 2004/0146018 A1* | 7/2004 | Walton et al. ............... 370/329 |
| 2004/0157645 A1 | 8/2004 | Smith et al. |
| 2004/0165675 A1 | 8/2004 | Ito et al. |
| 2004/0190636 A1 | 9/2004 | Oprea |
| 2004/0190639 A1 | 9/2004 | Pauli et al. |
| 2004/0203473 A1 | 10/2004 | Liu |
| 2004/0248604 A1 | 12/2004 | Vaidyanathan |
| 2005/0002440 A1 | 1/2005 | Alamouti et al. |
| 2005/0017511 A1 | 1/2005 | Dalton |
| 2005/0026570 A1 | 2/2005 | Han |
| 2005/0047515 A1 | 3/2005 | Walton et al. |
| 2005/0078762 A1* | 4/2005 | Ketchum et al. ............ 375/267 |
| 2005/0094552 A1 | 5/2005 | Abe et al. |
| 2005/0111599 A1 | 5/2005 | Walton et al. |
| 2005/0149320 A1 | 7/2005 | Kajala et al. |
| 2005/0175115 A1 | 8/2005 | Walton et al. |
| 2005/0180312 A1 | 8/2005 | Walton et al. |
| 2005/0195733 A1 | 9/2005 | Walton et al. |
| 2005/0220199 A1 | 10/2005 | Sadowsky et al. |
| 2005/0238111 A1 | 10/2005 | Wallace et al. |
| 2005/0249159 A1 | 11/2005 | Abraham et al. |
| 2005/0249174 A1 | 11/2005 | Lundby et al. |
| 2005/0265275 A1 | 12/2005 | Howard et al. |
| 2005/0267925 A1 | 12/2005 | Clue |
| 2005/0276347 A1 | 12/2005 | Mujtaba et al. |
| 2006/0002496 A1 | 1/2006 | Wallace et al. |
| 2006/0013250 A1 | 1/2006 | Howard et al. |
| 2006/0050770 A1 | 3/2006 | Wallace et al. |
| 2006/0056531 A1 | 3/2006 | Li et al. |
| 2006/0067277 A1 | 3/2006 | Thomas et al. |
| 2006/0067421 A1 | 3/2006 | Walton et al. |
| 2006/0068718 A1 | 3/2006 | Li et al. |
| 2006/0106902 A1 | 5/2006 | Howard et al. |
| 2006/0155798 A1 | 7/2006 | Ketchum et al. |
| 2006/0234789 A1 | 10/2006 | Tarokh et al. |
| 2006/0274844 A1 | 12/2006 | Walton et al. |
| 2006/0285531 A1 | 12/2006 | Howard et al. |
| 2007/0009059 A1 | 1/2007 | Wallace et al. |
| 2007/0217538 A1 | 9/2007 | Waxman |
| 2007/0249296 A1 | 10/2007 | Howard et al. |
| 2007/0268181 A1 | 11/2007 | Howard et al. |
| 2008/0031372 A1 | 2/2008 | Walton et al. |
| 2008/0031374 A1 | 2/2008 | Walton et al. |
| 2008/0095121 A1 | 4/2008 | Shattil |
| 2008/0095282 A1 | 4/2008 | Walton et al. |
| 2008/0273617 A1 | 11/2008 | Lundby et al. |
| 2009/0290657 A1 | 11/2009 | Howard et al. |
| 2010/0074301 A1 | 3/2010 | Howard et al. |
| 2010/0169396 A1 | 7/2010 | Howard et al. |
| 2011/0142097 A1 | 6/2011 | Walton et al. |
| 2012/0213181 A1 | 8/2012 | Walton et al. |
| 2012/0250788 A1 | 10/2012 | Walton et al. |

FOREIGN PATENT DOCUMENTS

| | | |
|---|---|---|
| CN | 1476695 A | 2/2004 |
| CN | 1592144 A | 3/2005 |
| EP | 0091999 A1 | 10/1983 |
| EP | 0752793 A2 | 1/1997 |
| EP | 0905920 A2 | 3/1999 |
| EP | 1009124 A2 | 6/2000 |
| EP | 1073214 A1 | 1/2001 |
| EP | 1185001 A2 | 3/2002 |
| EP | 1220506 A1 | 7/2002 |
| EP | 1223702 A1 | 7/2002 |
| EP | 1241824 | 9/2002 |
| EP | 1353452 A2 | 10/2003 |
| EP | 1361686 | 11/2003 |
| EP | 1396956 A1 | 3/2004 |
| JP | 11163822 A | 6/1999 |
| JP | 11205026 A | 7/1999 |
| JP | 2000068975 | 3/2000 |
| JP | 2001077788 A | 3/2001 |
| JP | 2001237751 A | 8/2001 |
| JP | 2002503048 T | 1/2002 |
| JP | 2002524972 | 8/2002 |
| JP | 2003249914 A | 9/2003 |
| JP | 2004023416 A | 1/2004 |
| JP | 2004064654 A | 2/2004 |
| JP | 2004072150 A | 3/2004 |
| JP | 2004096753 A | 3/2004 |
| JP | 2004509556 A | 3/2004 |
| JP | 2004104790 A | 4/2004 |
| JP | 2005027294 A | 1/2005 |
| JP | 2005519567 A | 6/2005 |
| JP | 2005524331 T | 8/2005 |
| JP | 2006503522 | 1/2006 |
| JP | 2007504188 A | 3/2007 |
| JP | 2007515131 | 6/2007 |
| JP | 2007515829 T | 6/2007 |
| JP | 2007523549 T | 8/2007 |
| JP | 2007523550 T | 8/2007 |
| JP | 2007529972 T | 10/2007 |
| JP | 2007538414 T | 12/2007 |
| JP | 2008505544 | 2/2008 |
| JP | 2008526116 | 7/2008 |
| JP | 2007527150 | 1/2011 |
| KR | 200260860 | 7/2002 |
| KR | 20040061023 A | 7/2004 |
| KR | 20040089748 | 10/2004 |
| KR | 20060123496 | 12/2006 |
| RU | 2103768 C1 | 1/1998 |
| RU | 2111619 C1 | 5/1998 |
| RU | 2116698 C1 | 7/1998 |
| RU | 2202152 | 4/2003 |
| RU | 2238611 C1 | 10/2004 |
| RU | 2005115862 | 1/2006 |
| RU | 2292116 C2 | 1/2007 |
| TW | 341680 | 10/1998 |
| TW | 350047 | 1/1999 |
| TW | 466385 B | 12/2001 |
| TW | 508960 | 11/2002 |
| TW | 510103 B | 11/2002 |
| TW | 512602 B | 12/2002 |
| TW | 200304287 | 9/2003 |
| TW | I337487 B | 2/2011 |
| WO | 9737456 A2 | 10/1997 |
| WO | 0014921 A1 | 3/2000 |
| WO | 0044144 A1 | 7/2000 |
| WO | 0156218 A1 | 8/2001 |
| WO | 0176110 A2 | 10/2001 |
| WO | 0205506 | 1/2002 |
| WO | 0219565 A2 | 3/2002 |
| WO | 0225857 A1 | 3/2002 |
| WO | 02078211 A2 | 10/2002 |
| WO | 02093784 A1 | 11/2002 |

(56) References Cited

FOREIGN PATENT DOCUMENTS

| WO | 03015334 | | 2/2003 |
|---|---|---|---|
| WO | 03041300 | A1 | 5/2003 |
| WO | 03050968 | A2 | 6/2003 |
| WO | 03056742 | A1 | 7/2003 |
| WO | 03058871 | A1 | 7/2003 |
| WO | 03063526 | A1 | 7/2003 |
| WO | 03071711 | | 8/2003 |
| WO | 03073646 | | 9/2003 |
| WO | WO-03077492 | A1 | 9/2003 |
| WO | 03094386 | A1 | 11/2003 |
| WO | 03101029 | A1 | 12/2003 |
| WO | 04002011 | | 12/2003 |
| WO | 04002047 | | 12/2003 |
| WO | 2004021605 | A1 | 3/2004 |
| WO | 2004038987 | | 5/2004 |
| WO | 2004039011 | | 5/2004 |
| WO | 2004043082 | A2 | 5/2004 |
| WO | 2004054191 | A1 | 6/2004 |
| WO | 2005060144 | | 6/2005 |
| WO | 2005060192 | A1 | 6/2005 |
| WO | 2005060298 | A1 | 6/2005 |
| WO | 2005088882 | A1 | 9/2005 |
| WO | 2005099211 | A1 | 10/2005 |
| WO | 2005114868 | | 12/2005 |
| WO | 2006053340 | A2 | 5/2006 |

OTHER PUBLICATIONS

Agustin A et al: "LDC Construction with a Defined Structure [MIMO Linear Dispersive Codes]" Vehicular Technology Confernece, 2003. VTC 2003—Fall. 2003 IEEE 58th Orlando, FL, USA Oct. 6-9, 2003, Piscataway NJ, USA, IEEE, US, Oct. 6, 2003, pp. 433-437 vol. 1 XP010700754 ISBN:0-7803-7954-3.

Alamouti, S.M., "A Simple Transmit Diversity Technique for Wireless Communications," IEEE Journal on Select Areas in Communications, vol. 16, No. 8, Oct. 1998, pp. 1451-1458.

Antenna-Theory.com, "Steering Vector", http://www.antenna-theory.com, pp. 1., No date given. (Cited by USPTO Examiner in U.S. Appl. No. 10/821,390 on Jan. 11, 2011).

Auer, G., "Channel Estimation for OFDM with Cyclic Delay Diversity," Personal, Indoor and Mobile Radio Communication, 2004. PIMRC 2004, 15th IEEE International Symposium on Sep. 5, 2004, vol. 3, pp. 1792-1796.

Bauch, et al., "Orthogonal Frequency Division Multiple Access with Cyclic Delay Diversity," ITG Workshop on Smart Antennas, Munich Germany, Mar. 18-19, 2004, pp. 17-24.

Bello: "Characterization of Randomly Time-Variante Linear Channels," Communications Systems, IEEE transactions on, vol. 11, Issue 4, pp. 360-393, Dec. 1963.

Bem et al., "Smart Antennas for Mobile Communications Systems," International Conference on Microwaves, Radar and Wireless Communications, vol. 3, May 22, 2000, pp. 120-130, XP010537479.

Bossert, et al., "On Cyclic Delay Diversity in OFDM Based Transmission Schemes," 7th International OFDM-Workshop (INOWO), Sep. 2002, XP002338873, Hamburg, Germany.

Bourdoux et al., "Non-reciprocal transceivers in OFDM/SDMA Systems: Impact and Mitigation," Radio and Wireless Conference, Aug. 10, 2003, pp. 183-186, XP010656728.

Branka et al., "Performance Limits of Multiple-Input Multiple-Output Wireless Communication Systems", Space-Time Coding, John Wiley& Sons. Ltd, Apr. 2003, England, pp. 1-9.

Bruhl et al., "Investigation of Front-end Requirements for MIMO-Systems Using Downlink Pre-Distortion," European Personal Mobile Communications Conference, 2003, pp. 472-476, XP002330243.

Chapter 10, Eigenvalues and Singular Values, pp. 1-39, Feb. 2008.

Crow, "The Fourier Matrix", Apr. 27, 2001, http://www.maths.abdn.ac.uk/~igc/tch/mx4002/notes/node91.html, pp. 1-3.

Dammann, A. et al., "Beamforming in Combination with Space-Time Diversity for Broadband OFDM Systems", ICC 2002. 2002 IEEE International Conference on Communications. Apr. 28-May 2, 2002, pp. 165-171, XP010589479.

Doonstnejad et al, "Space-time Spreading Codes for a Multiuser MIMO System," Institute of Electrical and Electronics Engineers, Conference Record of the 36th. Asilomar Conference on Signals, Systems & Computers, Pacific Grove, California, Nov. 3-6, 2002, pp. 1374-1378, XP10638423.

European Opinion—EP08153985 European Search Authority—The Hague—May 13, 2008.

European Search Report—EP08153985, Search Authority—The Hague—Apr. 22, 2008.

Farrokhi et al., "Link-Optimal Space-Time Processing with Multiple Transmit and Receive Antennas," IEEE Communications Letters, vol. 5, No. 3, pp. 85-87 (Mar. 2001).

Giacomantone, Javier Oscar, "Tradeoffs in Arithmetic Architectures for CORDIC Algorithm Design.", pp. 1-9, CeTAD—Fac. De Ingenieria—UNLP, Argentina [presented at IBERCHIP VII Workshop, Session 4, Montevideo, Uruguay, Mar. 21-23, 2001].

Gilbert et al., "Linear algebra and matrix theory," pressed by Academic Press Inc, Ch. 7, pp. 272-296 Dec. 31, 1995.

Goldsmith, Andrea et al., "Capacity Limits of MIMO Channels," IEEE Journal on Selected Areas in Communications, vol. 21, No. 5, pp. 684-702, Jun. 2003.

Gotze, J., et al., "An Algorithm and Architecture Based on Orthonormal Mu-Rotations for Computing the Symmetric EVD" Integration, The VLSI Journal, North-Holland Publishing Company. Amsterdam, NL, vol. 20, No. 1, Dec. 1, 1995, pp. 21-39.

Griffin, Grant R., "Cordic FAQ," lowegian's dspGuru. pp. 1-6.

Hanzo et al., Single and Multi-Carrier Ds-CDMA, "Space-Time Spreading Aided Single-Carrier Wideband CDMA Communicating Over Multipath Nakagami Fading Channels," Chapter 8, pp. 279-310, John Wiley & Sons, England, 2003 (XP-002357231).

Hemkumar N. D., et al. "Efficient Complex Matrix Transformations with CORDIC" Computer Arithmetic, 1994. Proceedings., 11th Symposium on Windsor, Ont., Canada Jun. 29-Jul. 2, 1993, Los Alamitos, CA, USA, IEEE Comput. Soc, Jun. 29, 1993, pp. 122-129.

Hochwald et al., "A Transmitter Diversity Scheme for Wideband CDMA Systems based on Space-time Spreading", Selected Areas in Communications, vol. 19, No. 1, Jan. 2001.

Hochwald et al., "Unitary Space-Time Modulation for Multiple-Antenna Communications in Rayleigh Flat Fading," IEEE Transactions on Information Theory, vol. 46, No. 2, pp. 543-564 (2000).

Hochwald, et al., "Systematic Design of Unitary Space-Time Constellations," IEEE Transactons on Information Theory, 2000, 46 (6), 1962-1973.

Hsiao, S. et al.: "Parallel Singular Value Decomposition of Complex Matrices Using Multidimensional CORDIC Algorithms" IEEE Transactions of Signal Processing, IEEE Service Center, New York, NY, UA, vol. 44, No. 3, pp. 685-697, Mar. 1, 1996.

IEEE Std 802.11a-1999 (Supplement to IEEE Std 801.11-1999) "Part 11: Wireless LAN Medium Access Control (MAC) and Physical Layer (PHY) specifications: High-Speed physical Layer in the 5GHZ Band", pp. 1-90, Sep. 1999.

IEEE Std. 802.11g IEEE Standard for Information technology—Telecommunications and information exchange between systems—Local and metropolitan area networks—Specific requirements—Part 11: Wireless LAN Medium Access Control (MAC) and Physical Layer (PHY) Specifications, Amendment 4: Further Higher Data Rate Extension in the 2.4 GHz Band, LAN/MAN Standards Committee IEEE Computer Society Jun. 27, 2003, pp. i-x & 1-67.

International Preliminary Examination Reoprt—PCT/US2005/031467, International Search Authority—The International Bureau of WIPO—Mar. 6, 2007.

International Preliminary Examination Report—PCT/US05/015040—IPEA/US, May 12, 2006.

International Preliminary Examination Report—PCT/US2005/031450, International Search Authority—IPEA/US—Jul. 5, 2007.

International Preliminary Examination Report—PCT/US2006/028276 filed Jul. 19, 2006.

International Preliminary Report on Patentability—PCT/US05/015042, IPEA/US, Sep. 11, 2006.

(56) References Cited

OTHER PUBLICATIONS

International Preliminary Report on Patentability—PCT/US05/041784, International Search Authority—The International Bureau of WIPO, Geneva, Switzerland—Jun. 18, 2008.
International Preliminary Report on Patentability—PCT/US05/041783, International Search Authority—The International Bureau of WIPO, Geneva, Switzerland—Jun. 24, 2008.
International Preliminary Report on Patentability, PCT/US2004/042236, The International Preliminary Examining Authority, United States, Dec. 1, 2005.
International Preliminary Report on Patentability—PCT/05/008738, International Bureau of WIPO, Geneva Switzerland—Oct. 11, 2006.
International Preliminary Report on Patentability—PCT/US05/005261, International Preliminary Examination Authority—Alexandria, Virginia, US, Sep. 30, 2006.
International Preliminary Report on Patentability—PCT/US05/024615. IPEA/US—Jan. 4, 2007.
International Preliminary Report on Patentability—PCT/US05/07020, International Preliminary Examination Authority, Alexandria, Virginia, US, Dec. 26, 2006.
International Preliminary Report on Patentability—PCT/US2005/022840, International Preliminary Examination Authority, Alexandria, Virginia, US—Apr. 13, 2006.
International Preliminary Report Patentability—PCT/US2004/041643, International Search Authority—IPEA/US—Dec. 15, 2005.
International Search Report—PCT/US05/015040, International Search Authority—European Patent Office, Sep. 6, 2005.
International Search Report—PCT/US05/015042, International Search Authority—European Patent Office, Sep. 21, 2005.
International Search Report—PCT/US05/024615, International Search Authority—European Patent Office, Nov. 4, 2005.
International Search Report—PCT/US05/041784—International Search Authority, European Patent Office, May 30, 2008.
International Search Report—PCT/US2005/000828, International Search Authority—European Patent Office—Dec. 16, 2005.
International Search Report—PCT/US2005/007020, International Search Authority—European Patent Office, Jul. 6, 2005.
International Search Report—PCT/US2005/031450, International Search Authority—European Patent Office—Jan. 16, 2006.
International Search Report—PCT/US2005/031467, International Search Authority—European Patent Office—Mar. 16, 2006.
International Search Report PCT/US04/041643, International Search Authority—EPO Apr. 11, 2005.
International Search Report—PCT/US05/041783, International Search Authority—European Patent Office—Jun. 12, 2008.
International Search Report PCT/US2004/042236, International Search Authority—European Patent Office—Mar. 17, 2005.
International Search Report—PCT/US05/005261, International Search Authority—European Patent Office, Jun. 16, 2005.
International Search Report—PCT/US05/008738, International Search Authority—European Patent Office—Jul. 6, 2005.
International Search Report—PCT/US07/067323, International Search Authority—European Patent Office—Sep. 11, 2007.
International Search Report—PCT/US2005/022840, International Search Authority, European Patent Office—Oct. 12, 2005.
International Search Report—PCT/US2007/069498, International Search Authority—European Patent Office—Feb. 14, 2008.
Jihoon Choi et al., "Interpolation Based Transmit Beamforming for MIMO-OFDM with Limited Feedback", IEEE Communications Society, 2004, 249-253, Austin, Texas.
Jungnickel et al., "A Mimo System with Reciprocal Transceivers for the Time-division Duplex Mode," Antennas and Propagation Society International Symposium, vol. 2, Jun. 20, 2004, pp. 1267-1270, XP010721570.
Kaiser, "Spatial Transmit Diversity Techniques for Broadband OFDM Systems," IEEE Global Telecommunications Conference, 2000. GLOBECOM '00. San Francisco, CA, Nov. 27-Dec. 1, 2000, vol. 3, pp. 1824-1828, XP001195742.

Ketchum, John, et al., "PHY Design for Spatial Multiplexing MIMO WLAN," IEEE 802.11-04/0721r0, IEEE, Jul. 2004, pp. 1-33 (Spatial Spreading Mode, Intrinsic Transmission Mode).
Kim, M. et al.: "Design of Jacobi EVD Processor Based on CORDIC for DOA Estimation with Music Algorithm." Personal, Indoor, and Mobile Radio Communications, 2002. pp. 120-124, The 13th IEEE International Symposium on Sep. 15-18, 2002, Piscataway, NJ, USA, IEEE.
Laroia R et al., "Enhanced Opportunistic Beamforming," Vehicular Technology Conference, 2003. VTC 2003—Fall. IEEE 58th Orlando FL, USA Oct. 6-9, 2003, pp. 1762-1766, XP010702878.
Li, et al., "Transmit Diversity Over Quasi-Static Fading Channels Using Multiple Antennas and Random Signal Mapping," IEEE Transactions on Communications, vol. 51, No. 11, Nov. 2003, pp. 1918-1926.
Liu et al., "OFDM-MIMO WLAN AP Front-end Gain and Phase Mismatch Calibration," IEEE Radio and Wireless Conference, Sep. 2004, pp. 151-154, XP002330244.
Liu, Jung-Tao: "Successive decoding of multiple space time coded streams in multi-input multi-output systems," Global Telecommunications Conference, 2002. Globecom '02. IEEE, USA, Nov. 21, 2002, 1007-1011 vol. 1.
Medles et al., "Multistream Space-Time Coding by Spatial Spreading, Scrambling and Delay Diversity," IEEE International Conference on Acoustics, Speech and Signal Processing, vol. 4 of 4, XP-10803892, pp. 2429-2432 (2002).
Michalke C et al: Efficient tracking of eigenspaces and its application to eigenbeanforming Personal, Indoor and Mobile Radio Communications 14th IEEE Proceedings, Sep. 7, 2003, pp. 2847-2851, Sections II.B and III.C XP010678152.
Narula, et al., "Performance Limits of Coded Diversity Methods for Transmitter Antenna Arrays," IEEE Transactions on Information Theory, vol. 45, No. 7, Nov. 1999, pp. 2418-2433.
Nowak, et al., "An Efficient Implementation of a 256-point FFT Processor with CORDIC for OFDM Systems," Delft University of Technology, Faculty of Information Technology and Systems Circuits and Systems Group, pp. 427-434, ISBN: 90-73461-15-4. 1998. STW, 1998 1026-01:.
Oksa G et al: "Multi-level parallelism in the block Jacobi SVD algorithm" Parallel and Distribution Processing, 2001. Proceedings. Ninth Euromicr O Workshop. IEEE, Feb. 7, 2001, pp. 306-313, XP010532138, ISBN: 978-0-7695-0987-7.
Pan, et al., "Dynamic Sub-channel Allocation with Adaptive Beamforming for Broadband OFDM Wireless Systems," IEEE Global Telecommunications Conference, 2002. GLOBECOM '02. Taipei, Taiwan, Nov. 17-21, 2002, NewYork, NY, Nov. 17, 2002, vol. 1, pp. 711-715.
Ralf Seeger et al: "Advance Eigenbeamforming for the 3GPP UMTS FDD Downlink" ITG IEEE Workshop on Smart Antennas, XX, XX, Apr. 4, 2004, pp. 1-8, XP002468805, Section III.
Schafer F., et al.: "Effiicient Tracking of Eigenspaces and its application to MIMO systems" Proceedings of the IST Mobile and Wireless Communications Summit, Jun. 18, 2003, pp. 1-6, XP002478514.
Sharif et al., "On the Capacity of MIMO Broadcast Channel with Partial Side Information", Department of Electrical Engineering, CA Institute of Engineering, IEEE 2002, pp. 958-962.
Suthaharan, et al., Space-time coded MIMO-OFDM for high capacity and high data-rate wireless communication over frequency selective fading channels, Mobile and Wireless Communications Networks, 2002. 4th International Workshop on, USA, Sep. 11, 2002, 424-428.
Taiwan Search Report—TW09313943—TIPO—May 16, 2005.
Taiwan Search Report—TW093139540—TIPO—Mar. 16, 2012.
Taiwan Search Report—TW094100892—TIPO—Mar. 19, 2012.
Taiwan Search Report—TW094100892—TIPO—Jul. 4, 2012.
Taiwan Search Report—TW094104669—TIPO—Jun. 8, 2011.
Taiwan Search Report—TW094106644—TIPO—Mar. 7, 2012.
Taiwan Search Report—TW094109036—TIPO—Nov. 28, 2011.
Taiwan Search Report—TW094114572—TIPO—Sep. 14, 2011.
Taiwan Search Report—TW094114588—TIPO—Mar. 14, 2012.
Taiwan Search Report—TW094122884—TIPO—Aug. 10, 2011.
Taiwan Search Report—TW094130237—TIPO—Oct. 3, 2011.
Taiwan Search Report—TW094139368—TIPO—Apr. 20, 2012.

(56) References Cited

OTHER PUBLICATIONS

Taiwan Search Report—TW094139368—TIPO—Nov. 28, 2012.
Taiwan Search Report—TW096114238—TIPO—Apr. 12, 2011.
Taiwan Search Report—TW094122216—TIPO—Jul. 12, 2012.
T.L. Marzetta, B. Hassibi, B.M Hochwald, "Structured Unitary Space-Time Autocoding Constellations,"IEEE Trans. on IT,vol. 48, No. 4, April 2002.
Winters, J. "Smart antennas for wireless systems", IEEE Personal Communications, Dec. 5, 2003, pp. 1-113.
Written Opinion—PCT/US05/015040, International Search Authority—European Patent Office, Sep. 6, 2005.
Written Opinion—PCT/US05/015042, International Search Authority—European Patent Office, Sep. 21, 2005.
Written Opinion—PCT/US05/024615, International Search Authority—European Patent Office, Nov. 4, 2005.
Written Opinion—PCT/US2005/000828, International Search Authority, European Patent Office, Dec. 16, 2005.
Written Opinion—PCT/US2005/031467, International Search Authority—Mar. 16, 2006.
Written Opinion—PCT/US2007/069498, International Search Authority, European Patent Office, Feb. 14, 2008.
Written Opinion of IPEA—PCT/US05/015042—IPEA/US, Apr. 18, 2006.
Written Opinion—PCT/US2004/041643, International Search Authority—European Patent Office—Apr. 11, 2005.
Written Opinion, PCT/US2004/042236, International Search Authority, European Patent Office, Mar. 17, 2005.
Written Opinion—PCT/US05/005261, International Search Authority—European Patent Office, Jun. 16, 2005.
Written Opinion—PCT/US05/007020, International Search Authority—European Patent Office, Jul. 6, 2005.
Written Opinion—PCT/US05/008738, International Search Authority—European Patent Office—Jul. 6, 2005.
Written Opinion—PCT/US05/041783, International Search Authority—European Patent Office—Jun. 12, 2008.
Written Opinion—PCT/US05/041784, International Search Authority—European Patent Office—May 30, 2008.
Written Opinion—PCT/US2005/022840, International Search Authority, European Patent Office—Oct. 12, 2005.
Written Opinion—PCT/US2005/031450, International Search Authority—European Patent Office—Jan. 16, 2006.
Written Opinion—PCT/US2007/067323, International Search Authority—European Patent Office—Sep. 11, 2007.
Yao, Huan, "Efficient Signal, Code, and Receiver Designs for MIMO Communication Systems," Ph.D. Thesis, Massachusetts Institute of Technology, Cambridge, Massachusetts, May 21, 2003, 205 pages.
Yu and Cioffi, "Trellis Precoding for the Broadcast Channel," IEEE Global Telecommunications Conference, vol. 2, Electrical Engineering Department, Stanford, University, Stanford, California (2001), pp. 1344-1348.

\* cited by examiner

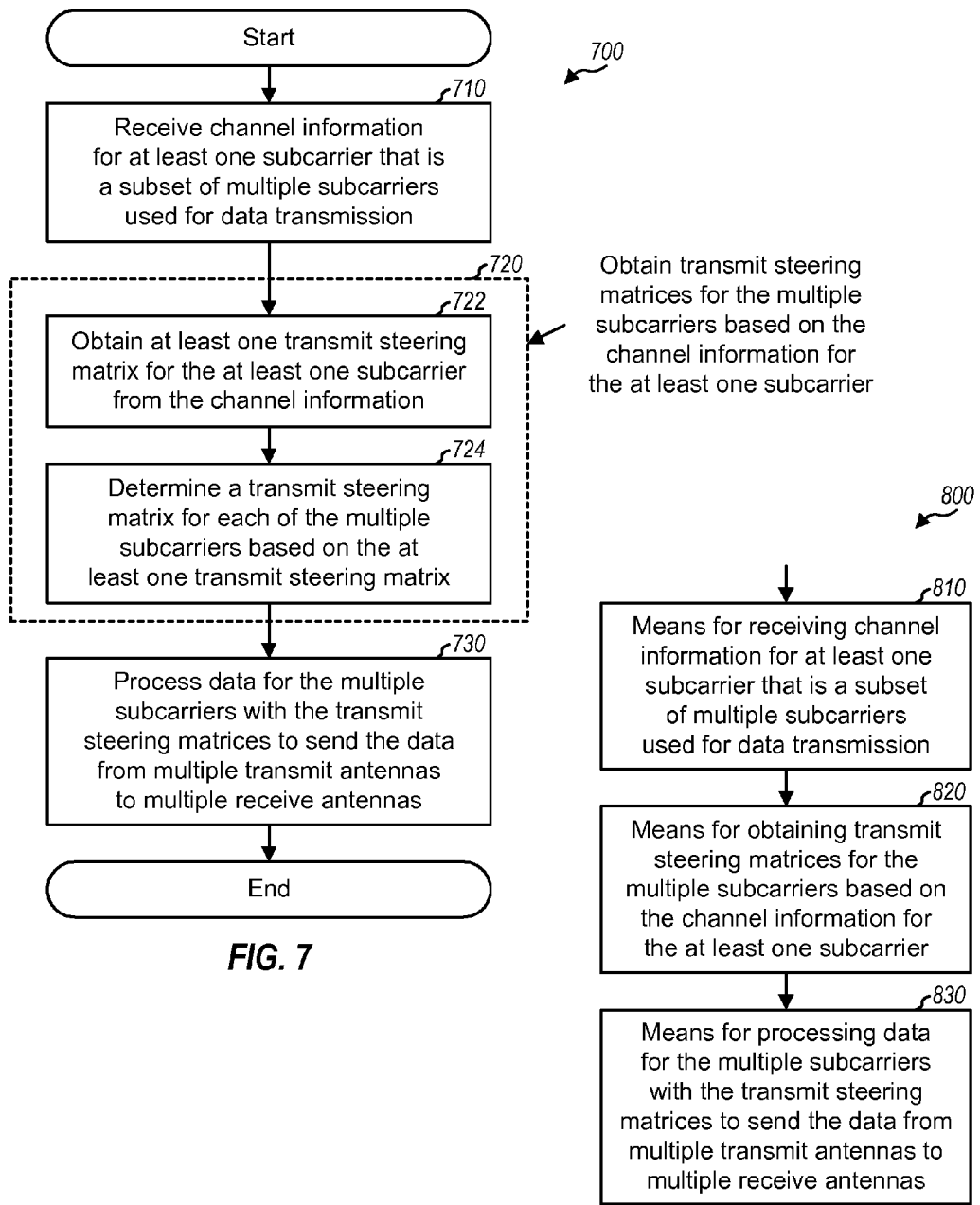

US 8,824,583 B2

REDUCED COMPLEXITY BEAM-STEERED MIMO OFDM SYSTEM

PRIORITY CLAIM

The present Application for Patent is a divisional of patent application Ser. No. 11/481,705, entitled "REDUCED COMPLEXITY BEAM-STEERED MIMO OFDM SYSTEM" filed Jul. 5, 2006 which claims priority to Provisional Application No. 60/794,615 entitled "REDUCED COMPLEXITY STEERED MIMO OFDM SYSTEMS" filed Apr. 24, 2006. Both of said applications are assigned to the assignee hereof and hereby expressly incorporated by reference herein as if fully set forth below and for all applicable purposes.

BACKGROUND

I. Field

The present disclosure relates generally to communication, and more specifically to techniques for transmitting data in a multiple-input multiple-output (MIMO) system.

II. Background

In a wireless communication system, a transmitter may utilize multiple (T) transmit antennas for data transmission to a receiver equipped with multiple (R) receive antennas. The multiple transmit and receive antennas form a MIMO channel that may be used to increase throughput and/or improve reliability. For example, the transmitter may transmit up to T data streams simultaneously from the T transmit antennas to improve throughput. Alternatively, the transmitter may transmit a single data stream from all T transmit antennas to improve reception by the receiver.

Good performance (e.g., high throughput) may be achieved by transmitting data on the eigenmodes of the MIMO channel. The eigenmodes may be viewed as orthogonal spatial channels. To transmit data on the eigenmodes, the transmitter obtains a transmit steering matrix, which is derived based on a MIMO channel response matrix, and performs spatial processing with the transmit steering matrix.

The system may have multiple subcarriers that may be used for data transmission. To transmit data on the eigenmodes of each of the subcarriers, the transmitter may obtain a transmit steering matrix for each subcarrier and perform spatial processing for that subcarrier with the transmit steering matrix. However, deriving the transmit steering matrix for each subcarrier may require significant computational resources at the transmitter and/or receiver. Furthermore, a significant amount of radio resources may be needed to send the transmit steering matrices, or pilot signals used to derive the transmit steering matrices, from the receiver to the transmitter.

There is therefore a need in the art for techniques to transmit data with less computation and feedback overhead.

SUMMARY

Techniques for transmitting data using channel information for a subset of all subcarriers used for data transmission are described herein. The techniques may provide good performance while reducing computation and feedback overhead.

In an embodiment, a transmitter station receives channel information for at least one subcarrier that is a subset of multiple subcarriers used for data transmission. The channel information may comprise at least one transmit steering matrix, at least one set of eigenvectors, at least one channel response matrix, or at least one channel covariance matrix for the at least one subcarrier. The channel information may also comprise an unsteered pilot or a steered pilot sent on the at least one subcarrier. In any case, the transmitter station obtains at least one transmit steering matrix for the at least one subcarrier from the channel information. The transmitter station determines a transmit steering matrix for each of the multiple subcarriers, which may be (1) set equal to the transmit steering matrix for the closest one of the at least one subcarrier or (2) derived by interpolating two or more transmit steering matrices for two or more closest subcarriers. The transmitter station performs transmit steering or beam-steering for each of the multiple subcarriers with the transmit steering matrix for that subcarrier.

In an embodiment, a receiver station sends channel information for the at least one subcarrier to the transmitter station and receives the data transmission sent on the multiple subcarriers. The receiver station may obtain at least one channel response matrix for the at least one subcarrier and decompose the at least one channel response matrix to obtain at least one transmit steering matrix, e.g., $V(k)$ and/or $U(k)$, which are described below. The receiver may send at least one transmit steering matrix $V(k)$ as explicit feedback. The receiver station may also send a steered pilot on the at least one subcarrier using at least one transmit steering matrix $U(k)$. The steered pilot is one form of implicit feedback. The receiver station determines transmit steering matrices for the multiple subcarriers based on the at least one transmit steering matrix in the same manner as the transmitter station. The receiver station derives spatial filter matrices for the multiple subcarriers based on the channel response matrices and the transmit steering matrices for these subcarriers. The receiver station then performs detection with the spatial filter matrices.

Various aspects and embodiments of the disclosure are described in further detail below.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

FIG. 7 shows a process for transmitting data.

FIG. 8 shows an apparatus for transmitting data.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The transmission techniques described herein may be used for various wireless communication networks such as wireless wide area networks (WWANs), wireless metropolitan area networks (WMANs), wireless local area networks (WLANs), and so on. The terms "network" and "system" are often used interchangeably. The techniques may also be used for various multiple access schemes such as Frequency Division Multiple Access (FDMA), Code Division Multiple Access (CDMA), Time Division Multiple Access (TDMA), Spatial Division Multiple Access (SDMA), Orthogonal FDMA (OFDMA), Single-Carrier FDMA (SC-FDMA), and so on. An OFDMA network utilizes Orthogonal Frequency Division Multiplexing (OFDM). An SC-FDMA network utilizes Single-Carrier Frequency Division Multiplexing (SC-FDM). OFDM and SC-FDM partition the system bandwidth into multiple (K) orthogonal subcarriers, which are also called tones, bins, and so on. Each subcarrier may be modulated with data. In general, modulation symbols are sent in the frequency domain with OFDM and in the time domain with SC-FDM. For clarity, the transmission techniques are described below for an OFDM-based network, which may be an OFDMA network, a WLAN that implements IEEE 802.11a, 802.11g and/or 802.11n, or some other network.

Figure 1:
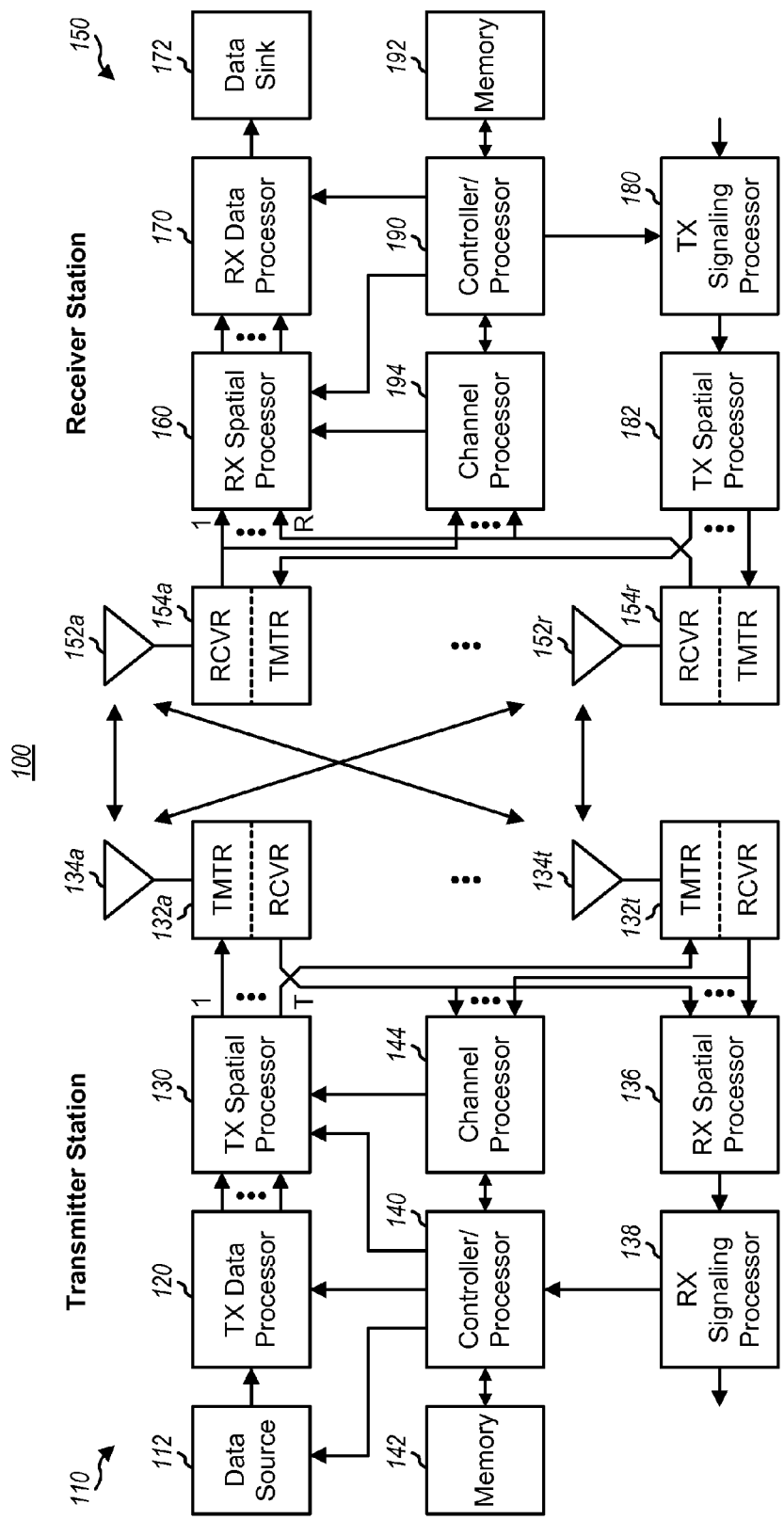
FIG. 1 shows a block diagram of a transmitter station and a receiver station.

FIG. 1 shows a block diagram of an embodiment of two stations 110 and 150 in a wireless communication network 100. For downlink (or forward link) transmission, station 110 may be part of, and may contain some or all of the functionality of, an access point, a base station, a Node B, and/or some other network entity. Station 150 may be part of, and may contain some or all of the functionality of, a terminal, a mobile station, a user equipment, a subscriber unit, and/or some other device. For uplink (or reverse link) transmission, station 110 may be part of a terminal, a mobile station, a user equipment, and so on, and station 150 may be part of an access point, a base station, a Node B, and so on. Station 110 is a transmitter of a data transmission and is equipped with multiple (T) antennas. Station 150 is a receiver of the data transmission and is equipped with multiple (R) antennas. Each transmit antenna and each receive antenna may be a physical antenna or an antenna array.

At transmitter station 110, a transmit (TX) data processor 120 receives traffic data from a data source 112, processes (e.g., formats, encodes, interleaves, and symbol maps) the traffic data in accordance with one or more rates, and generates data symbols. As used herein, a data symbol is a symbol for data, a pilot symbol is a symbol for pilot, and a symbol is typically a complex value. The data symbols and pilot symbols may be modulation symbols from a modulation scheme such as PSK or QAM. Pilot is data that is known a priori by both a transmitter and a receiver. A rate may indicate a data rate or information bit rate, a coding scheme or code rate, a modulation scheme, a packet size, and/or other parameters. A rate may also be referred to as a packet format, a transport format, or some other terminology. TX data processor 120 demultiplexes the data symbols into M streams, where 1≤M≤T. The data symbol streams may also be referred to as data streams, spatial streams, output streams, or some other terminology.

A TX spatial processor 130 multiplexes the data symbols with pilot symbols, performs transmit steering on the data symbols and/or pilot symbols as described below, and provides T output symbol streams to T transmitters (TMTR) 132a through 132t. Each transmitter 132 processes (e.g., OFDM modulates, converts to analog, filters, amplifies, and upconverts) its output symbol stream and generates a modulated signal. T modulated signals from transmitters 132a through 132t are transmitted from antennas 134a through 134t, respectively.

At receiver station 150, R antennas 152a through 152r receive the T modulated signals from transmitter station 110, and each antenna 152 provides a received signal to a respective receiver (RCVR) 154. Each receiver 154 processes (e.g., filters, amplifies, downconverts, digitizes, and OFDM demodulates) its received signal, provides received data symbols to a receive (RX) spatial processor 160, and provides received pilot symbols to a channel processor 194. Channel processor 194 estimates the MIMO channel response based on the received pilot symbols and provides channel estimates to RX spatial processor 160. RX spatial processor 160 performs MIMO detection on the received data symbols with the channel estimates and provides data symbol estimates. An RX data processor 170 further processes (e.g., deinterleaves and decodes) the data symbol estimates and provides decoded data to a data sink 172.

Receiver station 150 may send feedback information to base station 110. The feedback information may comprise one or more rates to use for transmission, transmit steering matrices, channel quality indicators (CQIs), and/or other information. The feedback information is processed by a TX signaling processor 180, multiplexed with pilot symbols and spatially processed by a TX spatial processor 182, and further processed by transmitters 154a through 154r to generate R modulated signals, which are transmitted via antennas 152a through 152r.

At transmitter station 110, the modulated signals from receiver station 150 are received by T antennas 134a through 134t, processed by receivers 132a through 132t, spatially processed by an RX spatial processor 136, and further processed by an RX signaling processor 138 to recover the feedback information sent by station 150. A controller/processor 140 controls the data transmission to receiver station 150 based on the feedback information. A channel processor 144 may estimate the channel response based on received pilot symbols and provides channel estimates, which may be used for transmit steering.

Controllers/processors 140 and 190 control the operation at stations 110 and 150, respectively. Memories 142 and 192 store data and program codes for stations 110 and 150, respectively.

The MIMO channel formed by the T antennas at transmitter station 110 and the R antennas at receiver station 150 may be characterized by an R×T channel response matrix H(k) for each subcarrier k, which may be expressed as:

$$H(k) = \begin{bmatrix} h_{1,1}(k) & h_{(1,2)}(k) & \ldots & h_{1,T}(k) \\ h_{2,1}(k) & h_{2,2}(k) & \ldots & h_{2,T}(k) \\ \vdots & \vdots & \ddots & \vdots \\ h_{R,1}(k) & h_{R,2}(k) & \ldots & h_{R,T}(k) \end{bmatrix}, \quad \text{Eq (1)}$$

$$k = 1, \ldots, K,$$

where entry $h_{i,j}(k)$, for i=1, . . . , R and j=1, . . . , T, is the coupling or complex gain between transmit antenna j and receive antenna i for subcarrier k. Receiver station 150 may estimate H(k) based on a pilot sent by transmitter system 110. For simplicity, the description herein assumes no error in channel estimation.

In certain aspects, to provide directionalized transmission the channel response matrix H(k) for each subcarrier k may be diagonalized with either eigenvalue decomposition or singular value decomposition to obtain S eigenmodes of H(k), where S≤min {T, R}. The eigenmodes may be viewed as orthogonal spatial channels.

Singular value decomposition of H(k) may be expressed as:

$$H(k) = U(k) \cdot \Sigma(k) \cdot V^H(k), \quad \text{Eq (2)}$$

where U(k) is an R×R unitary matrix of left singular vectors of H(k),

Σ(k) is an R×T diagonal matrix of singular values of H(k),

V(k) is a T×T unitary matrix of right singular vectors of H(k), and

"$H$" denotes a conjugate transpose.

A unitary matrix V is characterized by the property $V^H \cdot V = I$, where I is the identity matrix. The columns of V are orthogonal to one another and each column has unit power. The diagonal elements of Σ(k) are singular values that represent the channel gains of the eigenmodes of H(k).

Eigenvalue decomposition of H(k) may be expressed as:

$$R(k) = H^H(k) = V(k) \cdot \Lambda(k) \cdot V^H(k), \quad \text{Eq (3)}$$

where R(k) is a T×T channel covariance matrix,

Λ(k) is a T×T diagonal matrix of eigenvalues of R(k), and

V(k) is a T×T unitary matrix of eigenvectors of R(k).

The diagonal elements of Λ(k) are eigenvalues that represent the power gains of the eigenmodes of R(k). The eigenvalues in Λ(k) are the squares of the singular values in Σ(k).

As shown in equations (2) and (3), the columns of V(k) are right singular vectors of H(k) as well as eigenvectors of R(k). V(k) may be referred to as a transmit steering matrix, a beamforming matrix, an eigen-steering matrix, a steering matrix, and so on. The singular value decomposition in equation (2) and eigenvalue decomposition in equation (3) may be performed using various techniques, such as with Jacobi rotation described in commonly assigned U.S. patent application Ser. No. 10/096,839, entitled "Efficient Computation for Eigenvalue Decomposition and Singular Value Decomposition of Matrices," filed Mar. 31, 2005.

Transmitter station 110 may perform transmit steering with V(k) to send data symbols on the eigenmodes of H(k), as follows:

$$x(k) = V(k) \cdot s(k), \quad \text{Eq (4)}$$

where s(k) is a T×1 vector with up to S data symbols to be sent on subcarrier k, and x(k) is a T×1 vector with T output symbols for T antennas on subcarrier k.

Transmit steering with right singular vectors in equation (4) is also referred to as beam-steering, eigensteering, beamforming, eigen-beamforming, and so on. The transmit steering in equation (4) maximizes system capacity.

While the above discussion, relates to utilizing eigenvalue decomposition or singular value decomposition to determine the steering or beamforming vectors or matrices, other approaches to determining the directionality matrices, vectors, or weights may be utilized, with any of the aspects discusses herein.

Receiver station 150 may perform singular value decomposition or eigenvalue decomposition independently for each data subcarrier and obtain a set of transmit steering matrices for all data subcarriers. A data subcarrier is a subcarrier usable for data transmission. Receiver station 150 may then send the set of transmit steering matrices to transmitter station 110, which may perform transmit steering for each data subcarrier with the transmit steering matrix for that subcarrier.

System 100 may utilize time division duplexing (TDD), which uses a single frequency channel for both the downlink and uplink. Since one frequency channel is used for both links, the MIMO channel response for one link may be assumed to be reciprocal of the MIMO channel response for the other link. That is, if H(k) is the MIMO channel response for the link from transmitter station 110 to receiver station 150, then a reciprocal channel implies that the MIMO channel response for the link from receiver station 150 to transmitter station 110 may be given as $H^T(k)$, where "$T$" denotes a transpose. Channel reciprocity in the TDD system allows a channel response for one link to be estimated based on pilot sent on the other link. Thus, receiver station 150 may send a pilot to transmitter station 110, which may estimate the MIMO channel response based on the pilot from receiver station 150. Transmitter station 110 may then perform singular value decomposition or eigenvalue decomposition to obtain a set of transmit steering matrices for all data subcarriers.

In general, transmitter station 110 may obtain the transmit steering matrices based on explicit and/or implicit feedback from receiver station 150. Explicit feedback may comprise transmit steering matrices derived by receiver station 150 based on pilot sent by transmitter station 110 Implicit feedback may comprise pilot sent by receiver station 150 and used by transmitter station 110 to derive the transmit steering matrices. In any case, deriving a transmit steering matrix for each data subcarrier may require significant computational resources at the transmitter and/or receiver station. Furthermore, sending explicit and/or implicit feedback for each data subcarrier may require a significant amount of radio resources.

An OFDM-based system is typically designed such that a wideband, frequency selective communication channel appears like multiple, narrowband, flat-fading communication channels to a receiver. The spacing between adjacent subcarriers is typically selected to assure that each subcarrier experiences flat fading. The spacing is related to, and determined by, the expected maximum channel delay spread or minimum frequency coherence. In some aspects, some frequency coherence typically exists between subcarriers and adjacent subcarriers may be correlated with respect to their channel parameters. Thus, in certain aspects a transmit steering matrix derived for one subcarrier may be used for transmit steering of some nearby subcarriers. Significant reduction in computation and feedback overhead may be realized by reusing transmit steering matrices.

In an embodiment, receiver station 110 sends channel information for only a subset of all data subcarriers. The channel information may comprise transmit steering matrices V(k), eigenvectors or right singular vectors, channel response matrices H(k), channel covariance matrices R(k), unsteered pilot, steered pilot, and/or other channel related information. The subcarriers for which channel information is sent are referred to as designated subcarriers.

Figure 2:
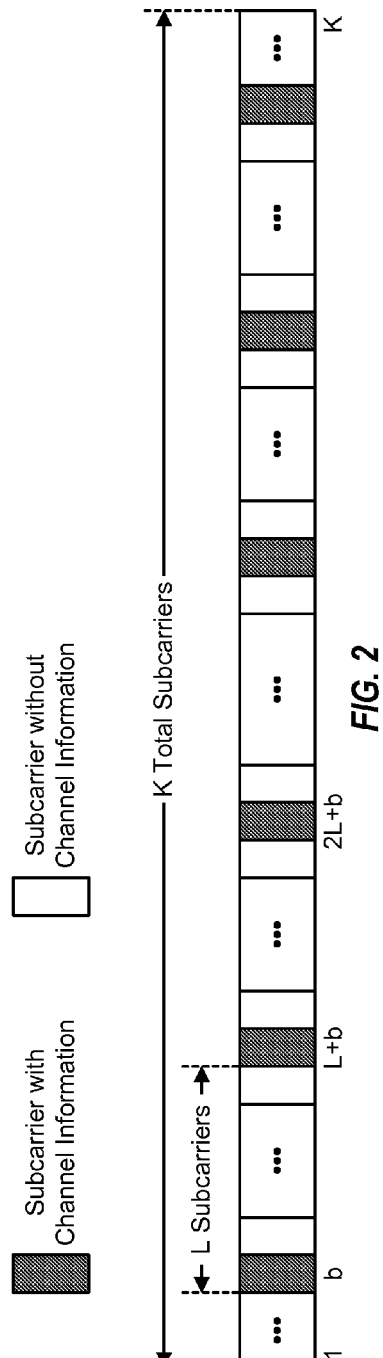
FIG. 2 shows feedback of channel information on fixed subcarriers.

FIG. 2 shows an embodiment of fixed designated subcarriers. In this embodiment, the K total subcarriers are assumed to be usable for transmission and are assigned indices of 1 through K. The designated subcarriers are uniformly distributed across the K subcarriers and include every L-th subcarrier, or subcarriers b, L+b, 2L+b, and so on, where L>1 and b is an index of the first designated subcarrier. The uniform distribution of the designated subcarriers allows for sampling of the entire system bandwidth in the frequency domain.

In an embodiment, L is a fixed value that is selected to provide good performance for most operating environments. In an embodiment, L is equal to three, which allows the channel information for a given designated subcarrier to be used for that designated subcarrier as well as data subcarriers to the left and right of the designated subcarrier. In another embodiment, L is a configurable value that may be any positive integer value. If L=1, then channel information is sent for each data subcarrier.

Figure 3:
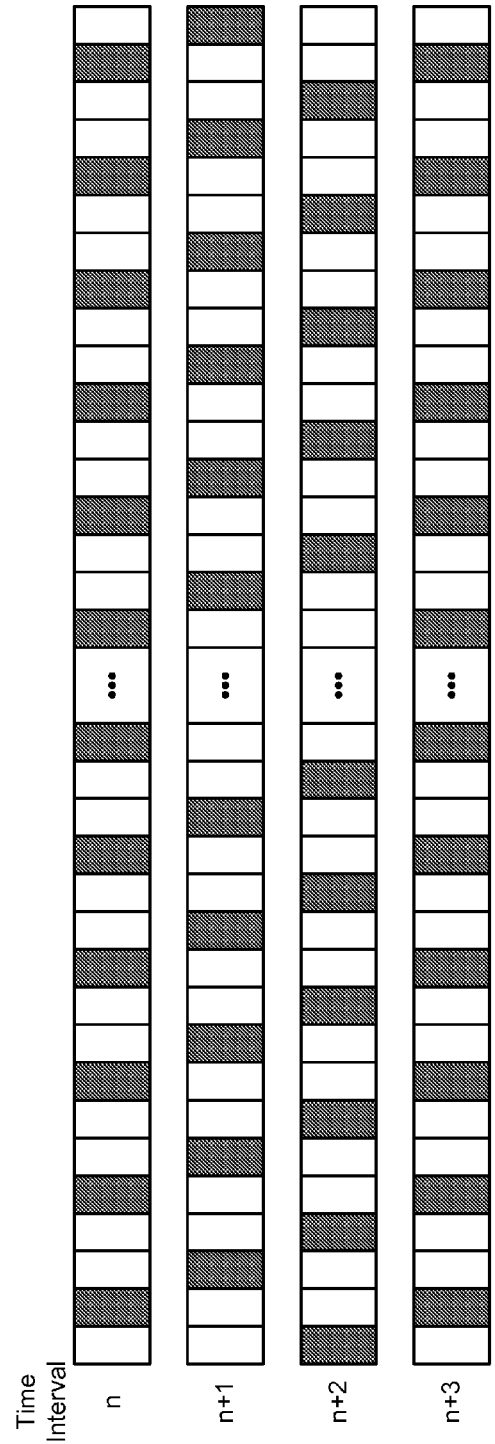
FIG. 3 shows feedback of channel information on varying subcarriers.

FIG. 3 shows an embodiment of varying designated subcarriers. In the example shown in FIG. 3, L=3, three sets of designated subcarriers are formed, and the subcarriers in each set are staggered with respect to the subcarriers in the other two sets. The three sets may be cycled through and selected in three time intervals, as shown in FIG. 3. In general, different designated subcarriers may be selected in different time intervals, e.g., based on a predetermined pattern or a pseudo-random sequence that is known to both the transmitter and receiver. Varying the designated subcarriers allows for feedback of channel information for different subcarriers in different time intervals, which may provide diversity against frequency selective fading.

Figure 4:
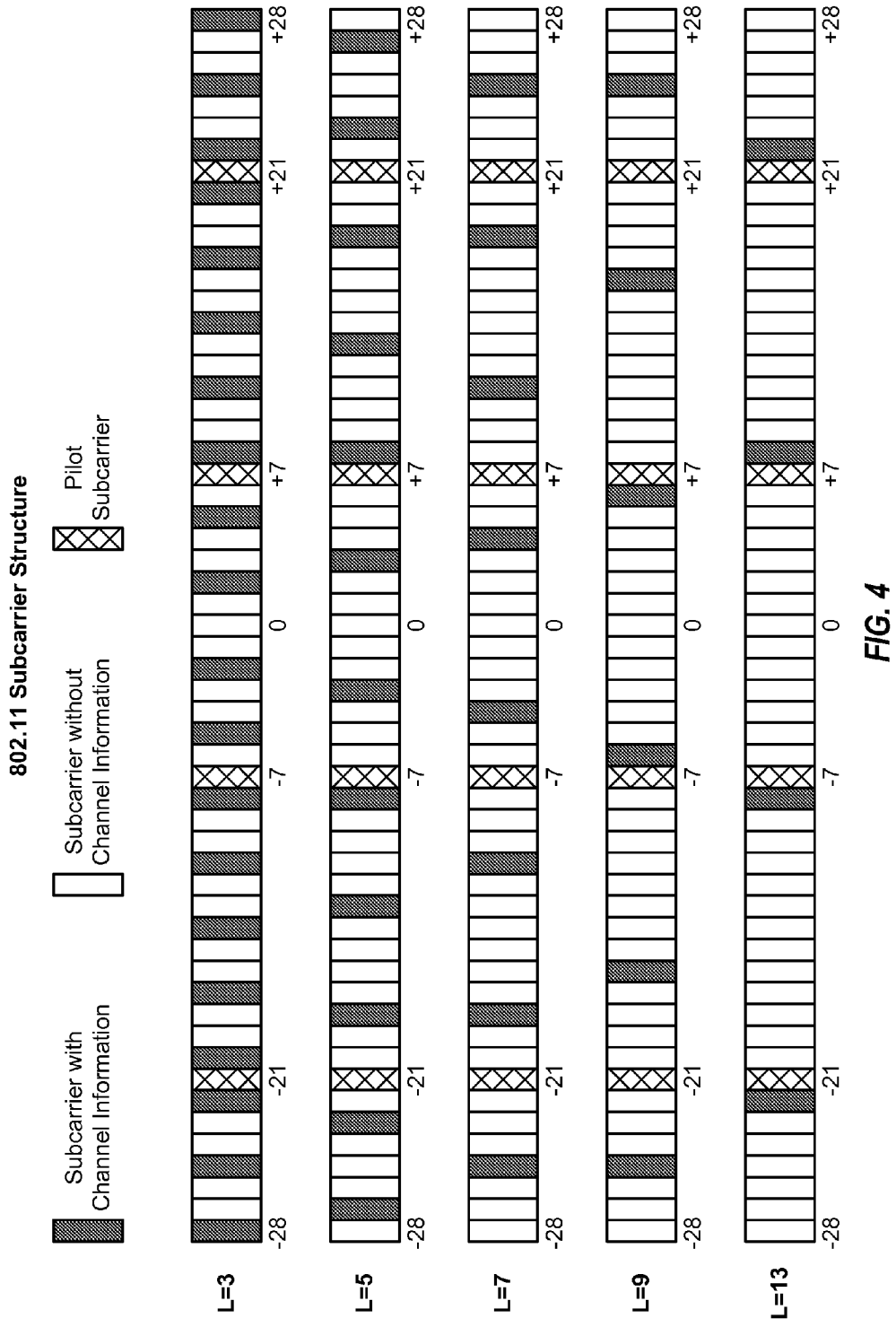
FIG. 4 shows feedback of channel information in IEEE 802.11.

FIG. 4 shows an embodiment of designated subcarriers for IEEE 802.11. IEEE 802.11 uses a subcarrier structure with K=64 total subcarriers that are assigned indices of −31 to +32. In IEEE 802.11a/g, 52 subcarriers with indices of −26 to −1 and +1 to +26 are usable for transmission, four subcarriers with indices of −21, −7, +7 and +21 are used for carrier pilot, and the subcarrier with index of 0 is not used for transmission. In IEEE 802.11n, 56 subcarriers with indices of −28 to −1 and +1 to +28 are usable for transmission. FIG. 4 and Table 1 show exemplary designated subcarriers for different values of L. Other designated subcarriers may also be selected.

TABLE 1

| L | Designated Subcarriers |
|---|---|
| 3 | ±2, 5, 8, 11, 14, 17, 20, 22, 25 and 28 |
| 5 | ±3, 8, 13, 18, 23 and 27 |
| 7 | ±4, 11, 18 and 25 |
| 9 | ±6, 16 and 25 |
| 13 | ±8 and 22 |

In an embodiment, the designated subcarriers are known a priori by both the transmitter and receiver stations. This embodiment avoids the need to send signaling to identify the designated subcarriers. In another embodiment, multiple sets of designated subcarriers are defined, and one set of designated subcarriers is selected for use and identified by signaling.

In an embodiment, L is configurable and determined based on channel conditions. The designated subcarriers may be selected during call setup, whenever changes in channel conditions are detected, and/or at other times. In an embodiment, receiver station 150 determines frequency selectivity of the wireless channel and selects L based on the amount of frequency selectivity. A smaller L value may be used for a wireless channel with more frequency selectivity, and a larger L value may be used for a wireless channel with less frequency selectivity.

Frequency selectivity may be quantified by delay spread, which is the difference between the arrival time of the earliest signal path and the arrival time of the latest signal path at receiver station 150. Delay spread may be determined by estimating a channel impulse response, determining the earliest delay $\tau_{min}$ and the latest delay $\tau_{max}$ for which the channel impulse response amplitude exceeds a predetermined threshold, and deriving the delay spread as $\tau_{max}-\tau_{min}$. Delay spread may also be determined by deriving a power delay profile, which is the power of the channel impulse response as a function of relative delay, and setting delay spread equal to the width of the power delay profile. Delay spread and delay power delay profile are described by P. A. Bello in a paper entitled "Characterization of Randomly Time-Variant Linear Channels," IEEE Trans. Communications, vol CS-11, pp 360-393, December 1963.

Frequency selectivity may also be quantified by coherence bandwidth, which is related to the rate of change of the channel response matrices as a function of frequency. A frequency correlation function Q(l) may be defined as:

$$Q(\ell) = \frac{1}{(K-\ell) \cdot T \cdot R} \cdot \sum_{k=1}^{K-\ell} \sum_{j=1}^{T} \sum_{i=1}^{R} h_{i,j}^*(k) \cdot h_{i,j}(k+\ell),\quad \text{Eq (5)}$$

where l represents frequency delta and "*" denotes a complex conjugate.

Coherence bandwidth may be estimated based on the width of Q(l) as follows:

$$BW_C = \frac{L_C + 1}{T_{sam}},\quad \text{Eq (6)}$$

where $L_C$ is the smallest value of l for which $|Q(l)| \leq \beta \cdot |Q(0)|$,
β is a threshold value between 0 and 1,
$T_{sam}$ is sample duration, and
$BW_C$ is the coherence bandwidth.

Delay spread and coherence bandwidth may also be determined in other manners. In general, coherence bandwidth is inversely related to delay spread. Hence, a smaller coherence bandwidth corresponds to a larger delay spread, and vice versa. L may be related to coherence bandwidth and inversely related to delay spread. A function or a look-up table may be defined for L versus delay spread or coherence bandwidth. A suitable L value may then be selected based on the estimated delay spread or coherence bandwidth of the wireless channel.

Receiver station 150 may send various types of channel information to transmitter station 110. In an embodiment of explicit feedback, receiver station 150 sends an entire transmit steering matrix V(k) for each designated subcarrier. In another embodiment of explicit feedback, receiver station 150 sends a partial transmit steering matrix for each designated subcarrier. In these embodiments, receiver station 150 may perform eigenvalue decomposition or singular value decomposition for each designated subcarrier, instead of each data subcarrier, which may reduce computation. Furthermore, receiver station 150 may perform decomposition for each designated subcarrier in an iterative manner, e.g., using Jacobi rotation. Receiver station 150 may use a final solution of the transmit steering matrix for one designated subcarrier as an initial solution of the transmit steering matrix for another designated subcarrier, which may reduce the number of iterations to derive the final solution.

In yet another embodiment of explicit feedback, receiver station 150 orders the singular values (or eigenvalues) for each subcarrier from largest to smallest and also orders the right singular vectors for that subcarrier in the same manner so that each right singular vector is associated with the same singular value before and after the ordering. The ordered right singular vectors may be denoted as $v_1(k), v_2(k), \ldots, v_T(k)$. The ordered singular values may be denoted as $\sigma_1(k) \geq \sigma_2(k) \geq \ldots \geq \sigma_T(k)$. A wideband eigenmode is the set of same-order eigenmodes for all subcarriers after the ordering, e.g., wideband eigenmode m includes eigenmode m of all subcarriers. Receiver station 150 may perform rank prediction and evaluate data performance (e.g., overall throughput) for different numbers of wideband eigenmodes, e.g., the best wideband eigenmode, the two best wideband eigenmodes, and so on, and min {T, R} wideband eigenmodes. The number of wideband eigenmodes with the best performance is denoted as M and referred to as the predicted rank of the MIMO channel, where $1 \leq M \leq \min\{T, R\}$. Receiver station

150 may then send the first M eigenvectors, corresponding to the M best wideband eigenmodes, for each designated subcarrier.

In another embodiment of explicit feedback, receiver station 150 sends a normalized right singular vector $\tilde{v}_1(k)$ for each designated subcarrier for the principal wideband eigenmode, which is the wideband eigenmode with the largest singular values. The elements of $\tilde{v}_1(k)$ have unit magnitude but the same phase as the elements of $v_1(k)$. $\tilde{v}_1(k)$ allows the full transmit power available for each antenna to be used for data transmission. In yet another embodiment of explicit feedback, receiver station 150 sends a channel response matrix $H(k)$ for each designated subcarrier. In yet another embodiment, receiver station 150 sends a channel covariance matrix $R(k)$ for each designated subcarrier.

In an embodiment that is applicable for explicit feedback, receiver station 150 sends full/complete values for each matrix reported to transmitter station 110. (A vector may be considered as a degenerated matrix containing one column.) In another embodiment, receiver station 150 sends full values for some reported matrices and differential/delta values for remaining reported matrices. For example, receiver station 150 may compute differential values for a channel response matrix $H(k_i)$ as $\Delta H(k_i) = H(k_i) - H(k_0)$ and may send back $H(k_0)$ and $\Delta H(k_i)$, where $k_i$ for $i = 0, 1, \ldots$, are designated subcarriers. In yet another embodiment, receiver station 150 maps a computed matrix to the nearest matrix in a codebook and sends the nearest matrix. For example, a codebook of possible matrices may be defined for $V(k)$, and one matrix may be selected from the codebook for each designated subcarrier based on the matrix computed for that subcarrier. In yet another embodiment, receiver station 150 performs coding or compression of the matrices to be reported in order to reduce the amount of information to send.

In an embodiment of implicit feedback, receiver station 150 sends an unsteered pilot on each designated subcarrier. An unsteered pilot is a pilot sent without transmit steering. Receiver station 150 may send an unsteered pilot via R antennas by (1) applying different orthogonal codes to the pilot transmissions sent from the R antennas or (2) sending the pilot transmissions from the R antennas in different time intervals. Transmitter station 110 may derive a channel response matrix for each designated subcarrier based on the unsteered pilot received on the subcarrier. Transmitter station 110 may decompose the channel response matrix for each designated subcarrier to obtain a transmit steering matrix for that subcarrier.

In another embodiment of implicit feedback, receiver station 150 sends a steered pilot on each designated subcarrier. A steered pilot is a pilot sent with transmit steering. Receiver station 150 may perform singular value decomposition of $H(k)$ as shown in equation (2) and obtain $U(k)$. Alternatively, receiver station 150 may perform eigenvalue decomposition of $H(k) \cdot H^H(k)$, instead of $H^H(k) \cdot H(k)$ as shown in equation (3), to obtain $U(k)$. Receiver station 150 may send a steered pilot on each eigenmode m, as follows:

$$x_m(k) = u_m^*(k) \cdot p(k), \quad \text{Eq (7)}$$

where $p(k)$ is a pilot symbol sent on subcarrier k, $u_m(k)$ is an R×1 left singular vector for eigenmodes m of subcarrier k, and $x_m(k)$ is an R×1 vector of output symbols for R antennas on subcarrier k.

In an embodiment, receiver station 150 may cycle through the S eigenmodes in different symbol periods. In another embodiment, receiver station 150 may send steered pilots on the S eigenmodes on different subcarriers, e.g., use subcarriers a, a+S, ... for eigenmode 1, use subcarriers a+1, a+S+1, ... for eigenmode 2, and so on, and use subcarriers a+S−1, a+2S−1, ... for eigenmode S.

The received steered pilot at transmitter station 110 may be expressed as:

$$\begin{aligned} \underline{r}_m(k) &= \underline{H}^T(k) \cdot \underline{x}_m(k) + \underline{n}_{tx}(k) \\ &= \underline{H}^T(k) \cdot \underline{u}_m^*(k) \cdot p(k) + \underline{n}_{tx}(k) \\ &= \underline{V}^*(k) \cdot \Sigma(k) \cdot \underline{U}^T(k) \cdot \underline{u}_m^*(k) \cdot p(k) + \underline{n}_{tx}(k) \\ &= \underline{v}_m^*(k) \cdot \sigma_m(k) \cdot p(k) + \underline{n}_{tx}(k) \end{aligned} \quad \text{Eq (8)}$$

where $H^T(k) = V^*(k) \cdot \Sigma(k) \cdot U^T(k)$ is the singular value decomposition of the wireless channel from receiver station 150 to transmitter station 110, $\sigma_m(k)$ is the singular value for eigenmode m of subcarrier k, and $n_{tx}(k)$ is a vector of noise for subcarrier k at transmitter station 110.

Equation (8) assumes channel reciprocity in a TDD system, so that $H^T(k)$ is the response of the MIMO channel from receiver station 150 to transmitter station 110. Equation (8) indicates that transmitter station 110 may estimate both $V(k)$ and $\Sigma(k)$ for each designated subcarrier based on a steered pilot sent by receiver station 150 without having to estimate the MIMO channel response or perform decomposition.

Transmitter station 110 obtains a transmit steering matrix for each designated subcarrier based on the channel information received from receiver station 150. Transmitter station 110 transmits data on the data subcarriers with the transmit steering matrices obtained for the designated subcarriers.

In an embodiment, transmitter station 110 performs transmit steering for each data subcarrier with the transmit steering matrix for the closest designated subcarrier. As an example, for L=3 in Table 1, the transmit steering matrix for designated subcarrier 2 may be used for each of data subcarriers 1, 2 and 3, the transmit steering matrix for designated subcarrier 5 may be used for each of data subcarriers 4, 5 and 6, and so on. For L=5 in Table 1, the transmit steering matrix for designated subcarrier 3 may be used for each of data subcarriers 1 through 5, the transmit steering matrix for designated subcarrier 8 may be used for each of data subcarriers 6, 8, 9 and 10, and so on.

In another embodiment, transmitter station 110 interpolates the transmit steering matrices for the designated subcarriers to obtain a transmit steering matrix for each data subcarrier. For example, transmitter station 110 may perform linear interpolation on two transmit steering matrices for two designated subcarriers to obtain L−1 interpolated transmit steering matrices for L−1 subcarriers between these two designated subcarriers. Transmitter station 110 may perform interpolation in other manners and/or on more than two transmit steering matrices for more than two designated subcarriers.

Transmitter station 110 may perform transmit steering for each data subcarrier as follows:

$$x(k) = \hat{V}(k) \cdot s(k), \quad \text{Eq (9)}$$

where $\hat{V}(k)$ is a transmit steering matrix for data subcarrier k. $\hat{V}(k)$ may be a transmit steering matrix for a designated subcarrier closest to data subcarrier k or an interpolated transmit steering matrix computed for data subcarrier k.

The received symbols at receiver station 150 may be expressed as:

$$r(k) = \underline{H}(k) \cdot \underline{x}(k) + \underline{n}_{rx}(k) \quad \text{Eq (10)}$$
$$= \underline{H}(k) \cdot \hat{\underline{V}}(k) \cdot \underline{s}(k) + \underline{n}_{rx}(k)$$
$$= \underline{H}_{eff}(k) \cdot \underline{x}(k) + \underline{n}_{rx}(k)$$

where $H_{eff}(k) = H(k) \hat{V}(k)$ is an effective channel response matrix for subcarrier k, and $n_{rx}(k)$ is a vector of noise for subcarrier k at receiver station 150.

For simplicity, the noise may be assumed to be additive white Gaussian noise (AWGN) with a zero mean vector and a covariance matrix of $n_{rx}(k) = \sigma_n^2 \cdot I$, where $\sigma_n^2$ is the variance of the noise.

Receiver station 150 may obtain $H_{eff}(k)$ in various manners. In one embodiment, transmitter station 110 sends an unsteered pilot on all or a subset of the data subcarriers. Receiver station 150 obtains a channel response matrix H(k) for each subcarrier in which the unsteered pilot is sent and decomposes the channel response matrix for each designated subcarrier to obtain a transmit steering matrix V(k) for that subcarrier. Receiver station 150 then sends the transmit steering matrices (or a steered pilot) for the designated subcarriers to transmitter station 110. Receiver station 150 also uses these transmit steering matrices to derive the effective channel response matrices for the data subcarriers.

In another embodiment, receiver station 150 sends an unsteered pilot on the designated subcarriers. Transmitter station 110 obtains a channel response matrix $H^T(k)$ for each designated subcarrier and decomposes $H^T(k)$ to obtain a transmit steering matrix V(k). Transmitter station 110 may send an unsteered or steered pilot on the designated subcarriers, on all data subcarriers, or a subset of data subcarriers to allow receiver station 150 to obtain the effective channel response matrices. In general, either station or both stations may send pilot, either station or both stations may perform decomposition, and receiver station 150 may obtain the effective channel response matrices in various manners.

Receiver station 150 may use various MIMO detection techniques to recover the data symbols sent by transmitter station 110. These MIMO detection techniques include minimum mean square error (MMSE), zero-forcing (ZF), maximal ratio combining (MRC), maximum likelihood (ML) decoding, list sphere decoding (LSD), decision feedback equalization (DFE), and successive interference cancellation (SIC) techniques. Receiver station 150 may derive a spatial filter matrix for each data subcarrier k based on the MMSE technique, as follows:

$$M(k) = D(k) \cdot [H_{eff}^H(k) \cdot H_{eff}(k) + \sigma_n^2 \cdot I]^{-1} \cdot H_{eff}^H(k), \quad \text{Eq (11)}$$

where $D(k) = [\text{diag}\{[H_{eff}^H(k) \cdot H_{eff}(k) + \sigma_n^2 \cdot I]^{-1} \cdot H_{eff}^H(k) \cdot H_{eff}(k)\}]^{-1}$ is a diagonal matrix of scaling values used to obtain normalized estimates of the data symbols.

Receiver station 150 may perform MIMO detection as follows:

$$\hat{s}(k) = M(k) \cdot r(k) = s(k) + \tilde{n}_{rx}(k), \quad \text{Eq (12)}$$

where ŝ(k) is a T×1 vector of data symbol estimates for data subcarrier k, and $\tilde{n}_{rx}(k)$ is a vector of noise after the MIMO detection.

The data symbol estimates in ŝ(k) are estimates of the data symbols in s(k).

Figure 5:
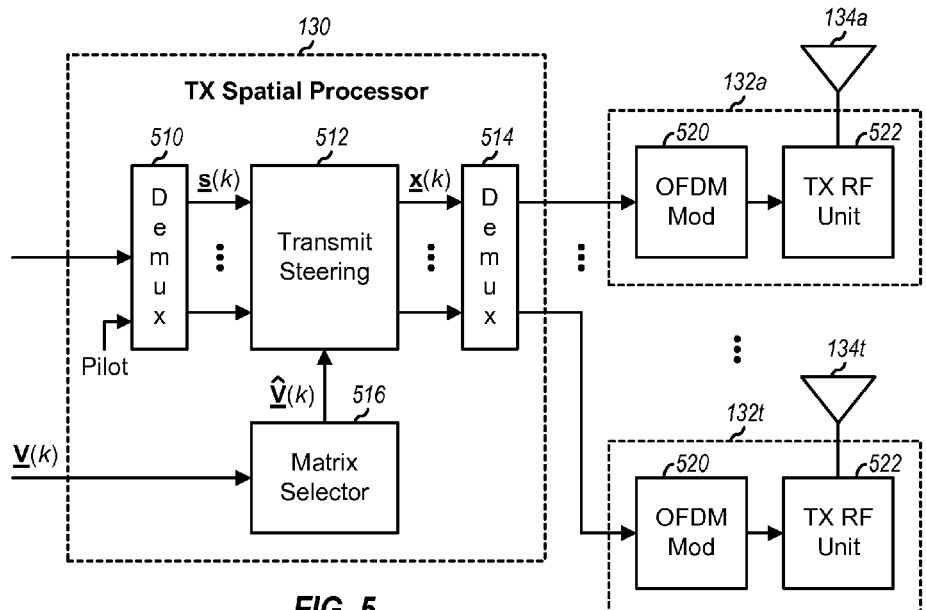
FIG. 5 shows a block diagram of a transmit (TX) spatial processor.

FIG. 5 shows a block diagram of an embodiment of TX spatial processor 130 and transmitters 132a through 132t at transmitter station 110. Within TX spatial processor 130, a demultiplexer (Demux) 510 receives the data symbols from TX data processor 120, maps the data symbols and pilot symbols to the proper subcarriers, and provides vector s(k) for each data subcarrier in each symbol period. A unit 516 receives transmit steering matrices V(k) for the designated subcarriers (e.g., from receiver station 150 or channel processor 144) and determines a transmit steering matrix V̂(k) for each data subcarrier (e.g., by using the transmit steering matrix for the closest designated subcarrier or by interpolating the transmit steering matrices for the closest designated subcarriers on both sides of the data subcarrier). A unit 512 performs transmit steering on vector s(k) for each data subcarrier with the transmit steering matrix V̂(k) for that subcarrier and provides output symbol vector x(k), as shown in equation (9). A demultiplexer 514 demultiplexes the output symbols and provides T output symbol streams to T transmitters 132a through 132t.

Each transmitter 132 includes an OFDM modulator (Mod) 520 and a TX radio frequency (RF) unit 522. OFDM modulator 520 receives an output symbol stream from demultiplexer 514 and generates OFDM symbols. TX RF unit 522 processes the OFDM symbols and generates a modulated signal for transmission via antenna 134.

Figure 6:
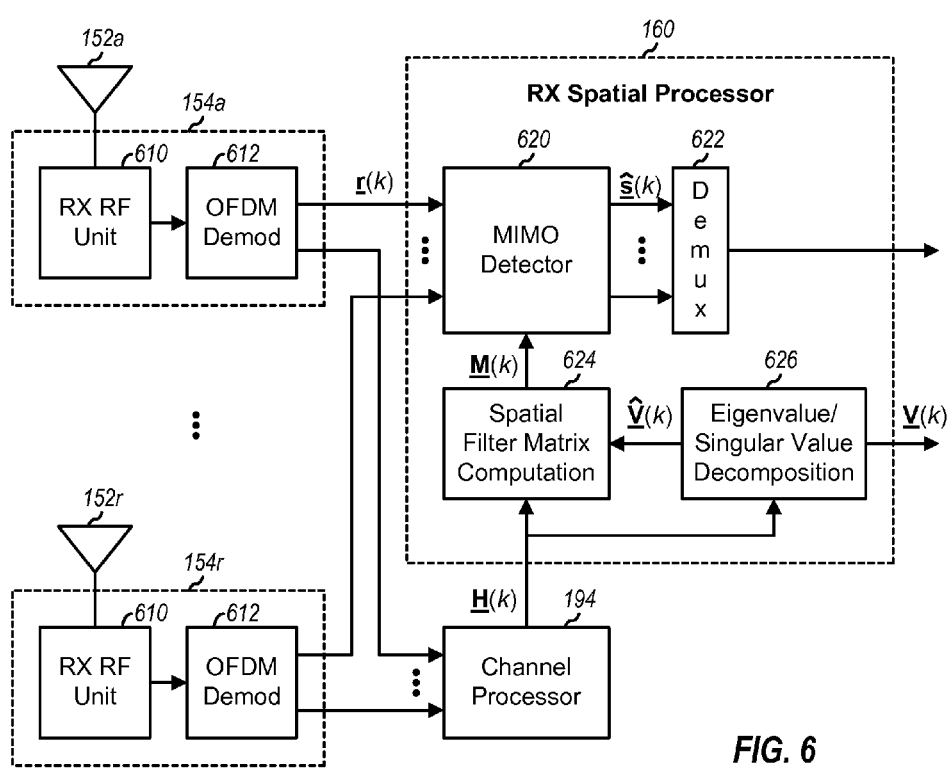
FIG. 6 shows a block diagram of a receive (RX) spatial processor.

FIG. 6 shows a block diagram of an embodiment of receivers 154a through 154r and RX spatial processor 160 at receiver station 150. Each antenna 152 receives the modulated signals from transmitter station 110 and provides a received signal to a respective receiver 154. Each receiver 154 includes an RX RF unit 610 and an OFDM demodulator (Demod) 612. RX RF unit 610 processes the received signal and provides samples. OFDM demodulator 612 performs OFDM demodulation on the samples, provides received data symbols to a MIMO detector 620 within RX spatial processor 160, and provides received pilot symbols to channel processor 194. Channel processor 194 estimates the MIMO channel response for each subcarrier with pilot transmission based on the received pilot symbols for that subcarrier. Channel processor 194 provides channel response matrices to a spatial filter matrix computation unit 624 and a decomposition unit 626 within RX spatial processor 160.

Unit 626 performs eigenvalue decomposition or singular value decomposition of the channel response matrix H(k) for each designated subcarrier and provides a transmit steering matrix V(k) for that subcarrier. The transmit steering matrices for the designated subcarriers may be sent back to transmitter station 110 or used to generate a steered pilot for transmitter station 110. Unit 626 also provides the transmit steering matrix V̂(k) for each data subcarrier to unit 624.

Unit 624 derives a spatial filter matrix M(k) for each data subcarrier based on the channel response matrix H(k) and the transmit steering matrix V̂(k) for that subcarrier, e.g., as shown in equation (11). Unit 624 may derive a spatial filter matrix for each data subcarrier whereas unit 626 may derive a transmit steering matrix for each designated subcarrier. Hence, a given transmit steering matrix V(k) may be used to derive spatial filter matrices for multiple data subcarriers. MIMO detector 620 performs MIMO detection on the received data symbols for each data subcarrier with the spatial filter matrix for that subcarrier, e.g., as shown in equation (12), and provides data symbol estimates. A demultiplexer 622 demultiplexes the data symbol estimates for all data subcarriers and provides the data symbol estimates to RX data processor 170.

The transmission techniques described herein may provide good data performance with substantial reduction in computation and feedback overhead. Computer simulations were performed for various MIMO dimensionalities (R×T), channel models, number of data streams, and receiver signal-tonoise ratios (SNRs). For the case with L=3 in Table 1, transmit steering matrices were derived for 20 out of 52 data subcarriers, and the transmit steering matrix for designated subcarrier j was used for data subcarriers j−1, j and j+1. Computation for transmit steering matrices was reduced by approximately 60% at a loss of about 3% of the capacity for channel model E compared to the case in which a transmit steering matrix was computed for each data subcarrier. Channel model E has the least frequency coherence, and performance is generally better for other channel models. Larger values of L provide greater reduction in computation albeit with more loss of capacity.

FIG. 7 shows an embodiment of a process 700 for transmitting data. A transmitter station receives channel information for at least one subcarrier that is a subset of multiple subcarriers used for data transmission (block 710). The channel information may comprise at least one transmit steering matrix, at least one set of eigenvectors, at least one channel response matrix, or at least one channel covariance matrix for the at least one subcarrier. The channel information may also comprise an unsteered pilot or a steered pilot sent on the at least one subcarrier. The at least one subcarrier may be distributed across the multiple subcarriers and may be fixed or varied across multiple time intervals. The transmitter station obtains transmit steering matrices for the multiple subcarriers based on the channel information for the at least one subcarrier (block 720). The transmitter station processes data for the multiple subcarriers with the transmit steering matrices to send the data from multiple transmit antennas to multiple receive antennas(block 730).

In an embodiment of block 720, the transmitter station obtains at least one transmit steering matrix for the at least one subcarrier from the channel information (block 722). If the channel information is an unsteered pilot, then at least one channel response matrix may be obtained for the at least one subcarrier based on the unsteered pilot and decomposed to obtain the at least one transmit steering matrix. If the channel information is a steered pilot, then the at least one transmit steering matrix may be obtained directly based on the steered pilot. The transmitter station determines a transmit steering matrix for each of the multiple subcarriers based on the at least one transmit steering matrix (block 724). The transmit steering matrix for each of the multiple subcarriers may be (1) set equal to the transmit steering matrix obtained for the closest one of the at least one subcarrier or (2) derived by interpolating two or more transmit steering matrices obtained for two or more closest subcarriers. In an embodiment of block 730, the transmitter station performs transmit steering for each of the multiple subcarriers with the transmit steering matrix determined for that subcarrier.

FIG. 8 shows an embodiment of an apparatus 800 for transmitting data. Apparatus 800 includes means for receiving channel information for at least one subcarrier that is a subset of multiple subcarriers used for data transmission (block 810), means for obtaining transmit steering matrices for the multiple subcarriers based on the channel information for the at least one subcarrier (block 820); and means for processing data for the multiple subcarriers with the transmit steering matrices to send the data from multiple transmit antennas to multiple receive antennas(block 830).

Figure 9:
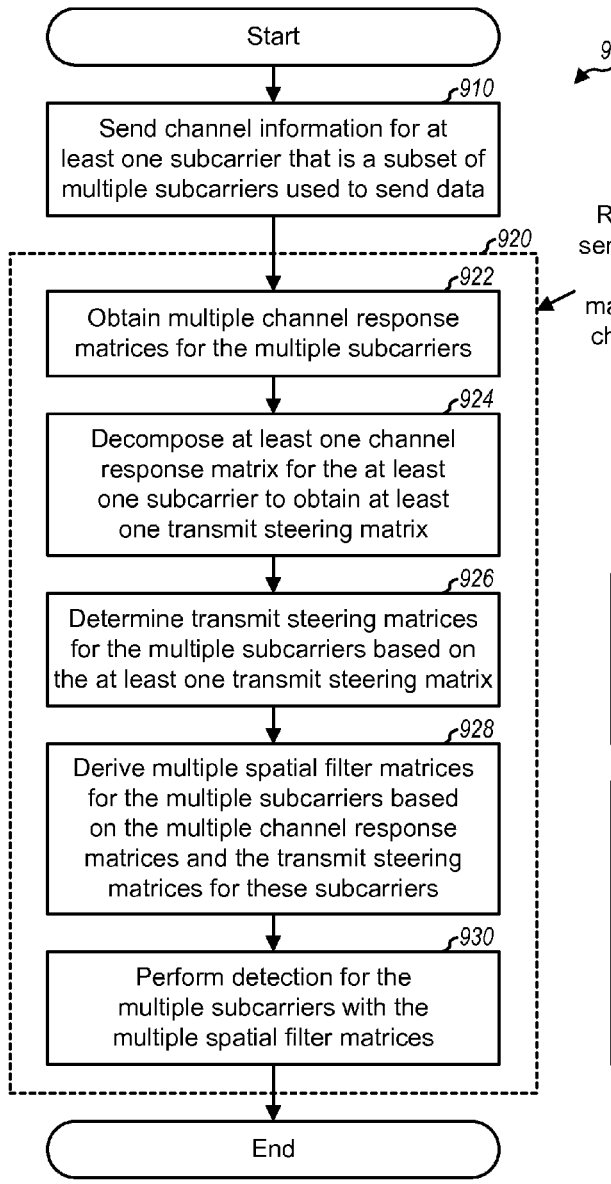
FIG. 9 shows a process for receiving data.

FIG. 9 shows an embodiment of a process 900 for receiving data. A receiver station sends channel information for at least one subcarrier that is a subset of multiple subcarriers used to send data (block 910). The receiver station receives a data transmission sent on the multiple subcarriers from multiple transmit antennas to multiple receive antennas using transmit steering matrices derived for the multiple subcarriers based on the channel information for the at least one subcarrier (block 920).

In an embodiment of block 910, the receiver station obtains at least one channel response matrix for the at least one subcarrier and decomposes the at least one channel response matrix to obtain at least one transmit steering matrix, e.g., V(k) and/or U(k). The receiver may send at least one transmit steering matrix V(k) as the channel information. The receiver station may also map the at least one transmit steering matrix V(k) to at least one codeword in a codebook and send the at least one codeword as the channel information. The receiver station may also send at least one channel response matrix or at least one channel covariance matrix as the channel information. The receiver station may also send a steered pilot on the at least one subcarrier using at least one transmit steering matrix U(k). The receiver station may determine frequency selectivity or delay spread of the wireless channel and determine the number of subcarriers to send channel information based on the frequency selectivity or delay spread of the wireless channel.

In an embodiment of block 920, the receiver station obtains multiple channel response matrices for the multiple subcarriers (block 922) and decomposes at least one channel response matrix for the at least one subcarrier to obtain at least one transmit steering matrix V(k) (block 924). The receiver station determines transmit steering matrices for the multiple subcarriers based on the at least one transmit steering matrix in the same manner as the transmitter station (block 926). The receiver station derives multiple spatial filter matrices for the multiple subcarriers based on the multiple channel response matrices and the transmit steering matrices for these subcarriers, e.g., in accordance with MMSE detection techniques (block 928). The receiver station then performs detection for the multiple subcarriers with the multiple spatial filter matrices (block 930).

Figure 10:
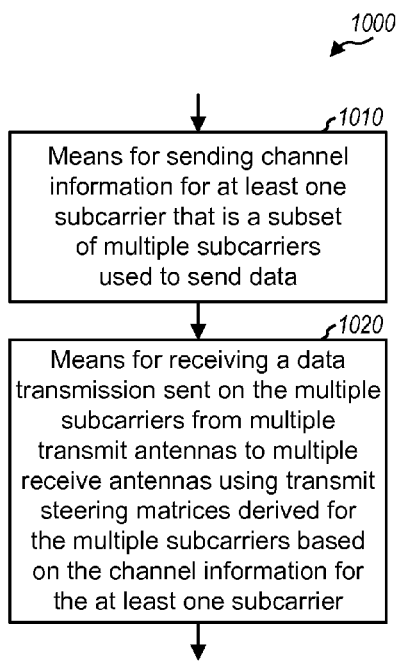
FIG. 10 shows an apparatus for receiving data.

FIG. 10 shows an embodiment of an apparatus 1000 for receiving data. Apparatus 1000 includes means for sending channel information for at least one subcarrier that is a subset of multiple subcarriers used to send data (block 1010) and means for receiving a data transmission sent on the multiple subcarriers from multiple transmit antennas to multiple receive antennas using transmit steering matrices derived for the multiple subcarriers based on the channel information for the at least one subcarrier (block 1020).

The transmission techniques described herein may be implemented by various means. For example, these techniques may be implemented in hardware, firmware, software, or a combination thereof. For a hardware implementation, the processing units at a transmitter station or a receiver station may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof For a firmware and/or software implementation, the techniques may be implemented with modules (e.g., procedures, functions, and so on) that perform the functions described herein. The firmware and/or software codes may be stored in a memory (e.g., memory 142 or 192 in FIG. 1) and executed by a processor (e.g., processor 140 or 190). The memory may be implemented within the processor or external to the processor.

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. An apparatus comprising:
at least one processor configured to send channel information for at least one subcarrier that is a subset of multiple subcarriers used to send data, and to receive a data transmission sent on the multiple subcarriers from multiple transmit antennas to multiple receive antennas using transmit steering matrices derived for the multiple subcarriers based on the channel information for the at least one subcarrier,
wherein the at least one processor is configured to obtain at least one channel response matrix for the at least one subcarrier, to decompose the at least one channel response matrix to obtain at least one transmit steering matrix, and to send a steered pilot on the at least one subcarrier using the at least one transmit steering matrix; and
a memory coupled to the at least one processor.

2. The apparatus of claim 1, wherein the at least one processor is configured to send the at least one transmit steering matrix as the channel information.

3. The apparatus of claim 1, wherein the at least one processor is configured to send the at least one code word as the channel information.

4. The apparatus of claim 1, wherein the at least one processor is configured to send the at least one channel response matrix as the channel information.

5. An apparatus comprising:
at least one processor configured to send channel information for at least one subcarrier that is a subset of multiple subcarriers used to send data, and to receive a data transmission sent on the multiple subcarriers from multiple transmit antennas to multiple receive antennas using transmit steering matrices derived for the multiple subcarriers based on the channel information for the at least one subcarrier,
wherein the at least one processor is configured to obtain at least one channel response matrix for the at least one subcarrier, to compute at least one channel covariance matrix for the at least one channel response matrix, and to send the at least one channel covariance matrix as the channel information; and
a memory coupled to the at least one processor.

6. An apparatus comprising:
at least one processor configured to send channel information for at least one subcarrier that is a subset of multiple subcarriers used to send data, and to receive a data transmission sent on the multiple subcarriers from multiple transmit antennas to multiple receive antennas using transmit steering matrices derived for the multiple subcarriers based on the channel information for the at least one subcarrier,
wherein the at least one processor is configured to obtain multiple channel response matrices for the multiple subcarriers, to derive multiple spatial filter matrices for the multiple subcarriers based on the multiple channel response matrices, and to perform detection for the multiple subcarriers with the multiple spatial filter matrices; and
a memory coupled to the at least one processor.

7. The apparatus of claim 6, wherein the at least one processor is configured to decompose at least one channel response matrix for the at least one subcarrier to obtain at least one transmit steering matrix, to determine the transmit steering matrices for the multiple subcarriers based on the at least one transmit steering matrix, and to derive a spatial filter matrix for each of the multiple subcarriers based on a channel response matrix and a transmit steering matrix for the subcarrier.

8. The apparatus of claim 7, wherein the at least one processor is configured to set the transmit steering matrix for each of the multiple subcarriers equal to a transmit steering matrix obtained for a closest one of the at least one subcarrier.

9. The apparatus of claim 6, wherein the at least one processor is configured to derive the multiple spatial filter matrices for the multiple subcarriers in accordance with minimum mean square error (MMSE) detection technique.

10. An apparatus comprising:
at least one processor configured to send channel information for at least one subcarrier that is a subset of multiple subcarriers used to send data, and to receive a data transmission sent on the multiple subcarriers from multiple transmit antennas to multiple receive antennas using transmit steering matrices derived for the multiple subcarriers based on the channel information for the at least one subcarrier,
wherein the at least one processor is configured to determine frequency selectivity of a wireless channel and to determine the number of subcarriers for sending channel information based on the frequency selectivity of the wireless channel; and
a memory coupled to the at least one processor.

11. An apparatus comprising:
at least one processor configured to send channel information for at least one subcarrier that is a subset of multiple subcarriers used to send data, and to receive a data transmission sent on the multiple subcarriers from multiple transmit antennas to multiple receive antennas using transmit steering matrices derived for the multiple subcarriers based on the channel information for the at least one subcarrier,
wherein the at least one processor is configured to determine delay spread of a wireless channel and to determine the number of subcarriers for sending channel information based on the delay spread of the wireless channel; and
a memory coupled to the at least one processor.

12. A method comprising:
obtaining at least one channel response matrix for at least one subcarrier that is a subset of multiple subcarriers used to send data;
decomposing the at least one channel response matrix to obtain at least one transmit steering matrix;
sending channel information for the at least one subcarrier, wherein the sending the channel information comprises sending a steered pilot on the at least one subcarrier using the at least one transmit steering matrix; and
receiving a data transmission sent on the multiple subcarriers from multiple transmit antennas to multiple receive antennas using transmit steering matrices derived for the multiple subcarriers based on the channel information for the at least one subcarrier.

13. The method of claim 12, wherein the channel information further comprises the at least one transmit steering matrix.

14. A method comprising:
sending channel information for at least one subcarrier that is a subset of multiple subcarriers used to send data;
receiving a data transmission sent on the multiple subcarriers from multiple transmit antennas to multiple receive antennas using transmit steering matrices derived for the multiple subcarriers based on the channel information for the at least one subcarrier;
obtaining multiple channel response matrices for the multiple subcarriers;
decomposing at least one channel response matrix for the at least one subcarrier to obtain at least one transmit steering matrix;
deriving multiple spatial filter matrices for the multiple subcarriers based on the multiple channel response matrices and the at least one transmit steering matrix; and
performing detection for the multiple subcarriers with the multiple spatial filter matrices.

15. An apparatus comprising:
means for obtaining at least one channel response matrix for at least one subcarrier that is a subset of multiple subcarriers used to send data;
means for decomposing the at least one channel response matrix to obtain at least one transmit steering matrix;
means for sending channel information for the at least one subcarrier, wherein the means for sending the channel information comprises means for sending a steered pilot on the at least one subcarrier using the at least one transmit steering matrix; and
means for receiving a data transmission sent on the multiple subcarriers from multiple transmit antennas to multiple receive antennas using transmit steering matrices derived for the multiple subcarriers based on the channel information for the at least one subcarrier.

16. The apparatus of claim 15, further comprising:
means for obtaining at least one channel response matrix for the at least one subcarrier; and
means for decomposing the at least one channel response matrix to obtain at least one transmit steering matrix, wherein the channel information comprises the at least one transmit steering matrix.

17. A non-transitory computer-readable medium including instructions stored thereon, comprising:
a first instruction set for obtaining at least one channel response matrix for at least one subcarrier that is a subset of multiple subcarriers used to send data;
a second instruction for decomposing the at least one channel response matrix to obtain at least one transmit steering matrix; and
a third instruction for sending channel information for the at least one subcarrier, wherein the channel information includes sending a steered pilot on the at least one subcarrier using the at least one transmit steering matrix; and
a fourth instruction set for directing reception of a data transmission sent on the multiple subcarriers from multiple transmit antennas to multiple receive antennas using transmit steering matrices derived for the multiple subcarriers based on the channel information for the at least one subcarrier.

18. The method of claim 14, further comprising:
decomposing at least one channel response matrix for the at least one subcarrier to obtain at least one transmit steering matrix;
determining the transmit steering matrices for the multiple subcarriers based on the at least one transmit steering matrix; and
deriving a spatial filter matrix for each of the multiple subcarriers based on a channel response matrix and a transmit steering matrix for the subcarrier.

19. The method of claim 18, further comprising setting the transmit steering matrix for each of the multiple subcarriers equal to a transmit steering matrix obtained for a closest one of the at least one subcarrier.

20. The method of claim 14, further comprising deriving the multiple spatial filter matrices for the multiple subcarriers in accordance with minimum mean square error (MMSE) detection technique.

21. A method comprising:
determining frequency selectivity of a wireless channel;
determining a number of subcarriers that is a subset of multiple subcarriers used to send data for sending channel information based on the frequency selectivity of the wireless channel;
sending the channel information for at least one subcarrier of the subset; and
receiving a data transmission sent on the multiple subcarriers from multiple transmit antennas to multiple receive antennas using transmit steering matrices derived for the multiple subcarriers based on the channel information for the at least one subcarrier.

22. A method comprising:
determining delay spread of a wireless channel;
determining a number of subcarriers that is a subset of multiple subcarriers used to send data for sending channel information based on the delay spread of the wireless channel;
sending the channel information for at least one subcarrier of the subset; and
receiving a data transmission sent on the multiple subcarriers from multiple transmit antennas to multiple receive antennas using transmit steering matrices derived for the multiple subcarriers based on the channel information for the at least one subcarrier.

23. A method comprising:
obtaining at least one channel response matrix for at least one subcarrier that is a subset of multiple subcarriers used to send data;
computing at least one channel covariance matrix for the at least one channel response matrix;
sending channel information for the at least one subcarrier, wherein the channel information comprises the at least one channel covariance matrix as the channel information; and receiving a data transmission sent on the multiple subcarriers from multiple transmit antennas to multiple receive antennas using transmit steering matrices derived for the multiple subcarriers based on the channel information for the at least one subcarrier.

* * * * *